US012382008B2

(12) United States Patent
Saini et al.

(10) Patent No.: US 12,382,008 B2
(45) Date of Patent: Aug. 5, 2025

(54) HEAD MOUNTED DISPLAY (HMD) DEVICE CALIBRATION BASED ON HINGE MOTION

(71) Applicant: QUALCOMM Incorporated, San Diego, CA (US)

(72) Inventors: Vinod Kumar Saini, Bengaluru (IN); Srujan Babu Nandipati, Bangalore (IN); Pushkar Gorur Sheshagiri, Bengaluru (IN); Chiranjib Choudhuri, Bangalore (IN); Ajit Deepak Gupte, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/344,549

(22) Filed: Jun. 29, 2023

(65) Prior Publication Data

US 2025/0008076 A1 Jan. 2, 2025

(51) Int. Cl.
*H04N 13/327* (2018.01)
*H04N 13/366* (2018.01)

(52) U.S. Cl.
CPC ......... *H04N 13/327* (2018.05); *H04N 13/366* (2018.05)

(58) Field of Classification Search
CPC .... H04N 13/327; H04N 13/366; G06F 3/012; G06F 3/0346
USPC .......................................................... 348/51
See application file for complete search history.

(56) References Cited

U.S. PATENT DOCUMENTS

| 2021/0183102 A1* | 6/2021 | Tang .................. G06T 15/06 |
| 2021/0263307 A1 | 8/2021 | Rotariu et al. |
| 2024/0111156 A1* | 4/2024 | Kalkgruber .......... G02B 27/017 |

FOREIGN PATENT DOCUMENTS

| CN | 205809417 U | 12/2016 |
| CN | 206057685 U | 3/2017 |
| CN | 108476311 A | 8/2018 |
| CN | 208126033 U | 11/2018 |

OTHER PUBLICATIONS

International Search Report and Written Opinion—PCT/US2024/035135—ISA/EPO—Sep. 30, 2024.

\* cited by examiner

*Primary Examiner* — Christopher S Kelley
*Assistant Examiner* — Ana Picon-Feliciano
(74) *Attorney, Agent, or Firm* — QUALCOMM Incorporated

(57) ABSTRACT

Systems and techniques are described herein for using head mounted display (HMD) hinge motion to calibrate the head mounted device. For example, an device (or component of the device) can obtain, via one or more sensors, sensor measurements during rotation of a display of the HMD between a first end of a range of motion of a hinge of the display about an axis and a second end of the range of motion of the hinge about the axis; determine parameters of the HMD based on the sensor measurements and the rotation of the display between the first end of the range of motion of the hinge and the second end of the range of motion of the hinge about the axis; and determine pose information for the HMD based on the determined parameters.

30 Claims, 13 Drawing Sheets

HEAD MOUNTED DISPLAY (HMD) DEVICE CALIBRATION BASED ON HINGE MOTION

TECHNICAL FIELD

The present disclosure generally relates to calibrating head mounted devices. For example, aspects of the present disclosure include systems and techniques for using head mounted display (HMD) hinge motion to calibrate the HMD (e.g., an extended reality (XR) HMD).

BACKGROUND

An XR system can provide a user with a virtual experience (e.g., an XR experience) by immersing the user in a completely virtual environment (made up of virtual content) and/or can provide the user with an augmented or mixed reality experience by combining a real-world or physical environment with a virtual environment. XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems include head-mounted displays (HMDs), such as AR HMDs (e.g., AR glasses) or VR HMDs (e.g., a VR headset). An XR HMD may need to be calibrated to allow the HMD to consistently determine accurate six degrees of freedom (6DoF) poses for the HMD.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for optimizing one or more parameters of a head mounted display (HMD) device (e.g., to calibrate the HMD and/or determine pose information for the HMD). According to at least one illustrative example, a method of calibrating an HMD is provided. The method includes: obtaining, by one or more sensors of the HMD, sensor measurements during rotation of a display of the HMD between a first end of a range of motion of a hinge of the display about an axis and a second end of the range of motion of the hinge about the axis; determining, by one or more processors of the HMD, parameters of the HMD based on the sensor measurements and the rotation of the display between the first end of the range of motion of the hinge and the second end of the range of motion of the hinge about the axis; and determining pose information for the HMD based on the determined parameters.

In another illustrative example, an apparatus is provided for optimizing one or more parameters of a head mounted display (HMD) device. The apparatus includes at least one memory and at least one processor coupled to the at least one memory and configured to: obtain, via one or more sensors, sensor measurements during rotation of a display of the HMD between a first end of a range of motion of a hinge of the display about an axis and a second end of the range of motion of the hinge about the axis; determine parameters of the HMD based on the sensor measurements and the rotation of the display between the first end of the range of motion of the hinge and the second end of the range of motion of the hinge about the axis; and determine pose information for the HMD based on the determined parameters.

In another illustrative example, a non-transitory computer-readable storage medium is provided that includes instructions stored thereon which, when executed by at least one processor, causes the at least one processor to obtain, via one or more sensors, sensor measurements during rotation of a display of the HMD between a first end of a range of motion of a hinge of the display about an axis and a second end of the range of motion of the hinge about the axis; determine parameters of the HMD based on the sensor measurements and the rotation of the display between the first end of the range of motion of the hinge and the second end of the range of motion of the hinge about the axis; and determine pose information for the HMD based on the determined parameters.

In another illustrative example, an apparatus is provided for optimizing one or more parameters of a head mounted display (HMD) device. The apparatus includes: means for obtaining sensor measurements during rotation of a display of the HMD between a first end of a range of motion of a hinge of the display about an axis and a second end of the range of motion of the hinge about the axis; means for determining parameters of the HMD based on the sensor measurements and the rotation of the display between the first end of the range of motion of the hinge and the second end of the range of motion of the hinge about the axis; and means for determining pose information for the HMD based on the determined parameters.

In some aspects, one or more of the apparatuses described herein is, is part of, and/or includes an XR device or system (e.g., a virtual reality (VR) device, an augmented reality (AR) device, or a mixed reality (MR) device), a mobile device (e.g., a mobile telephone or other mobile device), a wearable device, a wireless communication device, a camera, a personal computer, a laptop computer, a vehicle or a computing device or component of a vehicle, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
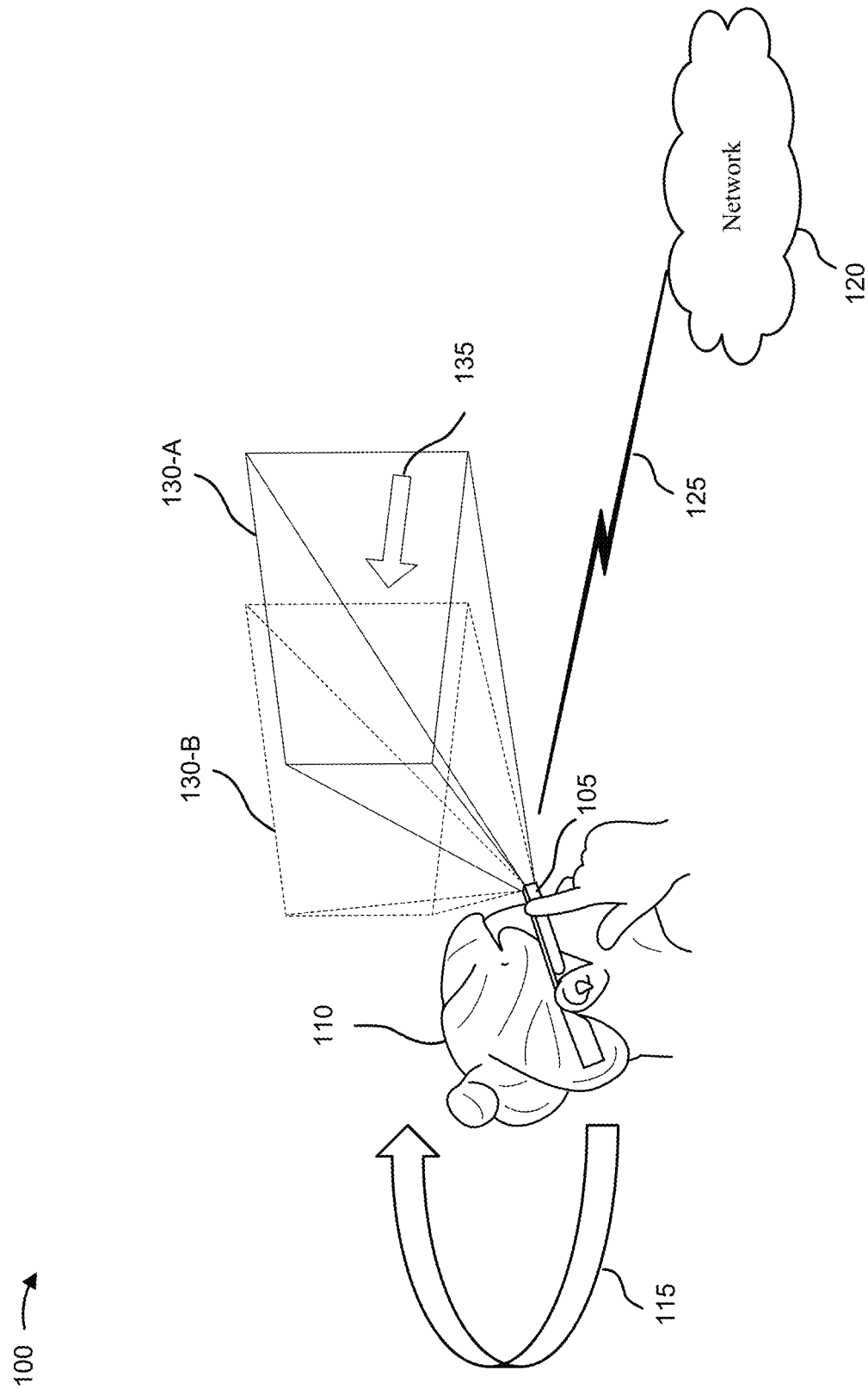
FIG. 1 is a diagram illustrating an example of an extended reality (XR) system, according to aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

An extended reality (XR) system or device can provide a user with an XR experience by presenting virtual content to the user (e.g., for a completely immersive experience) and/or can combine a view of a real-world or physical environment with a display of a virtual environment (made up of virtual content). The real-world environment can include real-world objects (also referred to as physical objects), such as people, vehicles, buildings, tables, chairs, and/or other real-world or physical objects. As used herein, the terms XR system and XR device are used interchangeably. Examples of XR systems or devices include HMDs (e.g., virtual reality (VR), augmented reality (AR), or mixed reality (MR) HMDs), smart glasses (e.g., AR glasses, mixed reality (MR) glasses, etc.), among others.

XR systems can include VR systems facilitating interactions with VR environments, AR systems facilitating interactions with AR environments, MR systems facilitating interactions with MR environments, and/or other XR systems. For instance, VR provides a complete immersive experience in a three-dimensional (3D) computer-generated VR environment or video depicting a virtual version of a real-world environment. VR content can include VR video in some cases, which can be captured and rendered at very high quality, potentially providing a truly immersive virtual reality experience. VR applications can include gaming, training, education, sports video, online shopping, among others. VR content can be rendered and displayed using a VR system or device, such as a VR HMD or other VR headset, which fully covers a user's eyes during a VR experience.

AR is a technology that provides virtual or computer-generated content (referred to as AR content) over the user's view of a physical, real-world scene or environment. AR content can include any virtual content, such as video, images, graphic content, location data (e.g., global positioning system (GPS) data or other location data), sounds, any combination thereof, and/or other augmented content. An AR system is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

MR technologies can combine aspects of VR and AR to provide an immersive experience for a user. For example, in an MR environment, real-world and computer-generated objects can interact (e.g., a real person can interact with a virtual person as if the virtual person were a real person).

An XR environment can be interacted with in a seemingly real or physical way. As a user experiencing an XR environment (e.g., an immersive VR environment) moves in the real world, rendered virtual content (e.g., images rendered in a virtual environment in a VR experience) also changes, giving the user the perception that the user is moving within the XR environment. For example, a user can turn left or right, look up or down, and/or move forwards or backwards, thus changing the user's point of view of the XR environment. The XR content presented to the user can change accordingly, so that the user's experience in the XR environment is as seamless as it would be in the real world.

In some cases, an XR system can match the relative pose and movement of objects and devices in the physical world. For example, an XR system can use tracking information to calculate the relative pose of devices, objects, and/or features of the real-world environment in order to match the relative position and movement of the devices, objects, and/or the real-world environment. The pose can have six degrees of freedom (6DoF) in some cases (referred to as a 6DoF pose), corresponding to a pose with three translational components (e.g., horizontal, vertical, and depth coordinates relative to a frame of reference, such as the image plane) and three angular components (e.g., roll, pitch, and yaw relative to the same frame of reference). In some examples, the XR system can use the pose and movement of one or more devices, objects, and/or the real-world environment to render content relative to the real-world environment in a convincing manner. The relative pose information can be used to match virtual content with the user's perceived motion and the spatio-temporal state of the devices, objects, and real-world environment. In some cases, an XR system can track parts of the user (e.g., a hand and/or fingertips of a user) to allow the user to interact with items of virtual content.

Frequent calibration of an XR HMD (e.g., an AR or VR HMD) may be required to allow the XR HMD to determine 6DoF poses consistently and accurately. In some cases, calibration of an XR HMD may include a joint optimization of all parameters (e.g., calibration parameters) by minimizing a reprojection error and a frame pose error measured by inertial measurement units (IMUs). However, there are limits in assumed known parameters (e.g., a scale may not be observable in an environment, there may be limited features, etc.), which can result in a suboptimal optimization of the calibration parameters. As such, an improved solution for calibration of XR HMDs can be beneficial.

Systems, apparatuses, electronic devices, methods (also referred to as processes), and computer-readable media (collectively referred to herein as "systems and techniques") are described herein for providing an improved solution for calibrating XR HMDs, such as AR/VR HMDs. According to some aspects, the systems and techniques provide a solution for using HMD hinge motion to calibrate the HMD. In one or more examples, an HMD can include a hinge movement detector configured to detect (e.g., based on input from an optical encoder, an end-to-end detector, etc.) movement of a display hinge (e.g., connecting a display of the HMD to a body or other portion of the HMD), or other movement mechanism, used to tilt a display(s) of the HMD and to allow for constrained display movement along or about one axis. The end-to-end detector can be any detector that can detect movement of a display hinge between a first end of a range of motion of the display hinge along a single axis (e.g., a pitch axis of the hinge of the display) and a second end of the range of motion of the display hinge along the single axis, such as one or more IMUs, an audio-based snap detector, an active edge sensor (e.g., including one or more strain gauges), or other device. Measurements obtained during movement of the display(s) by the hinge (e.g., IMU measurements, camera measurements, etc.), as detected by the hinge movement detector, can be used to calibrate the HMD (e.g., to determine calibration parameters for the HMD). In some aspects, the limits of the hinge movement at the extreme ends of the movement can be used to identify pose constraints (e.g., round trip identity pose constraint), such as based on known start and stop points for the movement of the hinge, that can be utilized for the calibration.

Various aspects of the application will be described with respect to the figures.

FIG. 1 illustrates an example of an extended reality system 100. As shown, the extended reality system 100 includes a device 105, a network 120, and a communication link 125. In some cases, the device 105 may be an extended reality (XR) device, which may generally implement aspects of extended reality, including virtual reality (VR), augmented reality (AR), mixed reality (MR), etc. Systems including a device 105, a network 120, or other elements in extended reality system 100 may be referred to as extended reality systems.

The device 105 may overlay virtual objects (e.g., synthetic content) with real-world objects in a view 130. For example, the view 130 may generally refer to visual input to a user 110 via the device 105, a display generated by the device 105, a configuration of virtual objects generated by the device 105, etc. For example, view 130-A may refer to visible real-world objects (also referred to as physical objects) and visible virtual objects, overlaid on or coexisting with the real-world objects, at some initial time. View 130-B may refer to visible real-world objects and visible virtual objects, overlaid on or coexisting with the real-world objects, at some later time. As discussed herein, positional differences in real-world objects (e.g., and thus overlaid virtual objects) may arise from view 130-A shifting to view 130-B at 135 due to head motion 115. In another example, view 130-A may refer to a completely virtual environment or scene at the initial time and view 130-B may refer to the virtual environment or scene at the later time.

Generally, device 105 may generate, display, project, etc. virtual objects and/or a virtual environment to be viewed by a user 110 (e.g., where virtual objects and/or a portion of the virtual environment may be displayed based on user 110 head pose prediction in accordance with the techniques described herein). In some examples, the device 105 may include a transparent surface (e.g., optical glass) such that virtual objects may be displayed on the transparent surface to overlay virtual objects on real word objects viewed through the transparent surface. Additionally or alternatively, the device 105 may project virtual objects onto the real-world environment. In some cases, the device 105 may include a camera and may display both real-world objects (e.g., as frames or images captured by the camera) and virtual objects overlaid on displayed real-world objects. In various examples, device 105 may include aspects of a virtual reality headset, a head mounted display (HMD), smart glasses, a live feed video camera, a GPU, one or more sensors (e.g., such as one or more IMUs, image sensors, microphones, etc.), one or more output devices (e.g., such as speakers, display, smart glass, etc.), etc.

In some cases, head motion 115 may include user 110 head rotations, translational head movement, etc. The device 105 may update the view 130 of the user 110 according to the head motion 115. For example, the device 105 may display view 130-A for the user 110 before the head motion 115. In some cases, after the head motion 115, the device 105 may display view 130-B to the user 110. The extended reality system (e.g., device 105) may render or update the virtual objects and/or other portions of the virtual environment for display as the view 130-A shifts to view 130-B.

Figure 2:
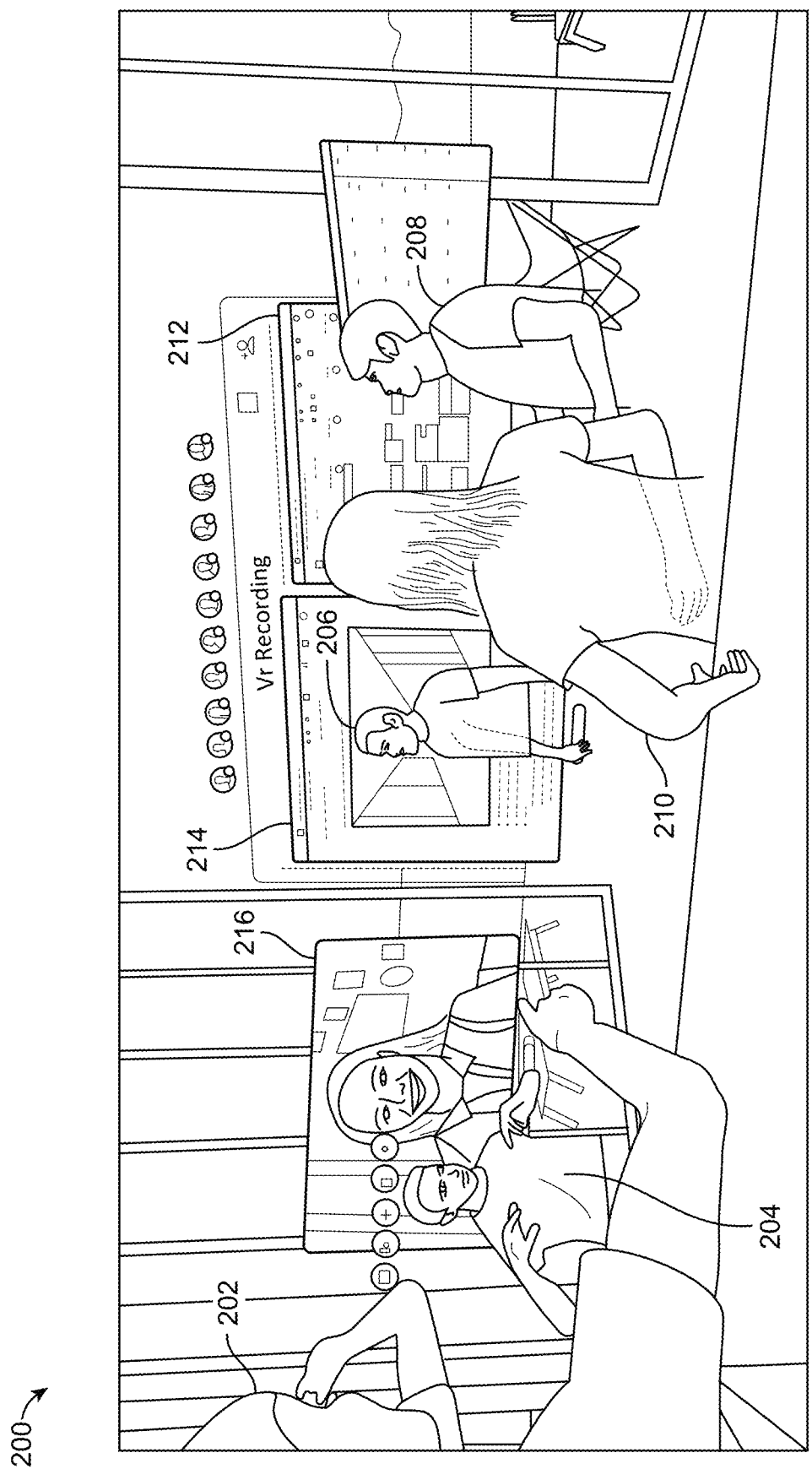
FIG. 2 is a diagram illustrating an example of a three-dimensional (3D) collaborative virtual environment, according to aspects of the disclosure.

In some cases, the extended reality system 100 may provide various types of virtual experiences, such as a three-dimensional (3D) collaborative virtual environment for a group of users (e.g., including the user 110). FIG. 2 is a diagram illustrating an example of a 3D collaborative virtual environment 200 in which various users interact with one another in a virtual session via virtual representations (or avatars) of the users in the virtual environment 200. The virtual representations include including a virtual representation 202 of a first user, a virtual representation 204 of a second user, a virtual representation 206 of a third user, a virtual representation 208 of a fourth user, and a virtual representation 210 of a fifth user. Other background information of the virtual environment 200 is also shown, including a virtual calendar 212, a virtual web page 214, and a virtual video conference interface 216. The users may visually, audibly, haptically, or otherwise experience the virtual environment from each user's perspective while interacting with the virtual representations of the other users. For example, the virtual environment 200 is shown from the perspective of the first user (represented by the virtual representation 202).

As noted previously, it is important for an XR system to efficiently generate high-quality virtual representations (or avatars) with low-latency. It can also be important for the XR system to render audio in an effective manner to enhance the XR experience. For instance, in the example of the 3D collaborative virtual environment 200 of FIG. 2, an XR system of the first user (e.g., the XR system 100) displays the virtual representations 204-210 of the other users participating in the virtual session. The virtual representations 204-210 of the users and the background of the virtual environment 200 should be displayed in a realistic manner (e.g., as if the users were meeting in a real-world environment), such as by animating the heads, bodies, arms, and hands of the other users' virtual representations 204-210 as the users move in the real world. Audio captured by XR systems of the other users may need to be spatially rendered or may be rendered monophonically for output to the XR system of the first user. Latency in rendering and animating the virtual representations 204-210 should be minimal so that user experience of the first user is as if the user is interacting with the other users in the real-world environment.

Figure 3:
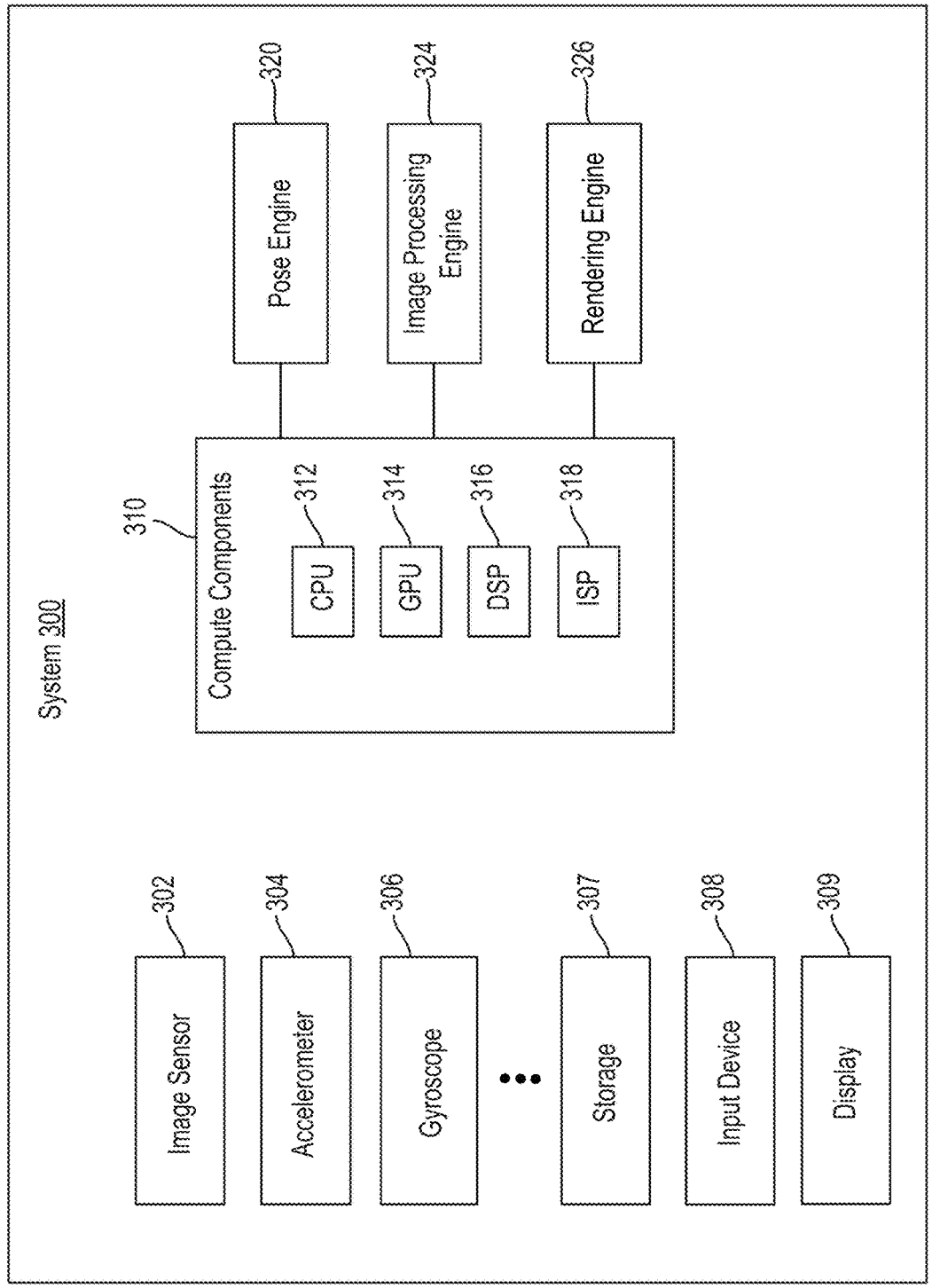
FIG. 3 is a block diagram illustrating an architecture of an example of an XR system, in accordance with some examples.

FIG. 3 is a diagram illustrating an architecture of an example system 300, in accordance with some aspects of the disclosure. The system 300 can be an XR system (e.g., running (or executing) XR applications and/or implementing XR operations), a system of a vehicle, a robotics system, or other type of system. The system 300 can perform tracking and localization, mapping of an environment in the physical world (e.g., a scene), and/or positioning and rendering of content on a display 309 (e.g., positioning and rendering of virtual content a screen, visible plane/region, and/or other display as part of an XR experience). For instance, the system 300 can generate a map (e.g., a three-dimensional (3D) map) of an environment in the physical world, track a pose (e.g., location and position) of the system 300 relative to the environment (e.g., relative to the 3D map of the environment), and/or determine a position and/or anchor point in a specific location(s) on the map of the environment. In one example, the system 300 can position and/or anchor virtual content in the specific location(s) on the map of the environment and can render virtual content on the display 309 such that the virtual content appears to be at a location in the environment corresponding to the specific location on the map of the scene where the virtual content is positioned and/or anchored. The display 309 can include a monitor, a glass, a screen, a lens, a projector, and/or other display mechanism. For example, in the context of an XR system, the display 309 can allow a user to see the real-world environment and also allows XR content to be overlaid, overlapped, blended with, or otherwise displayed thereon.

In this illustrative example, the system 300 can include one or more image sensors 302, an accelerometer 304, a gyroscope 306, storage 307, compute components 310, a pose engine 320, an image processing engine 324, and a rendering engine 326. It should be noted that the components 302-326 shown in FIG. 3 are non-limiting examples provided for illustrative and explanation purposes, and other examples can include more, less, or different components than those shown in FIG. 3. For example, in some cases, the system 300 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 3. While various components of the system 300, such as the image sensor 302, may be referenced in the singular form herein, it should be understood that the system 300 may include multiple of any component discussed herein (e.g., multiple image sensors 302).

The system 300 can include or is in communication with (wired or wirelessly) an input device 308. The input device 308 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, the image sensor 302 can capture images that can be processed for interpreting gesture commands.

In some implementations, the one or more image sensors 302, the accelerometer 304, the gyroscope 306, storage 307, compute components 310, pose engine 320, image processing engine 324, and rendering engine 326 can be part of the same computing device. For example, in some cases, the one or more image sensors 302, the accelerometer 304, the gyroscope 306, storage 307, compute components 310, pose engine 320, image processing engine 324, and rendering engine 326 can be integrated into a device or system, such as an HMD, XR glasses (e.g., AR glasses), a vehicle or system of a vehicle, smartphone, laptop, tablet computer, gaming system, and/or any other computing device. However, in some implementations, the one or more image sensors 302, the accelerometer 304, the gyroscope 306, storage 307, compute components 310, pose engine 320, image processing engine 324, and rendering engine 326 can be part of two or more separate computing devices. For example, in some cases, some of the components 302-326 can be part of, or implemented by, one computing device and the remaining components can be part of, or implemented by, one or more other computing devices.

The storage 307 can be any storage device(s) for storing data. Moreover, the storage 307 can store data from any of the components of the system 300. For example, the storage 307 can store data from the image sensor 302 (e.g., image or video data), data from the accelerometer 304 (e.g., measurements), data from the gyroscope 306 (e.g., measurements), data from the compute components 310 (e.g., processing parameters, preferences, virtual content, rendering content, scene maps, tracking and localization data, object detection data, privacy data, XR application data, face recognition data, occlusion data, etc.), data from the pose engine 320, data from the image processing engine 324, and/or data from the rendering engine 326 (e.g., output frames). In some examples, the storage 307 can include a buffer for storing frames for processing by the compute components 310.

The one or more compute components 310 can include a central processing unit (CPU) 312, a graphics processing unit (GPU) 314, a digital signal processor (DSP) 316, an image signal processor (ISP) 318, and/or other processor (e.g., a neural processing unit (NPU) implementing one or more trained neural networks). The compute components 310 can perform various operations such as image enhancement, computer vision, graphics rendering, tracking, localization, pose estimation, mapping, content anchoring, content rendering, image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 310 can implement (e.g., control, operate, etc.) the pose engine 320, the image processing engine 324, and the rendering engine 326. In other examples, the compute components 310 can also implement one or more other processing engines.

The image sensor 302 can include any image and/or video sensors or capturing devices. In some examples, the image sensor 302 can be part of a multiple-camera assembly, such as a dual-camera assembly. The image sensor 302 can capture image and/or video content (e.g., raw image and/or video data), which can then be processed by the compute components 310, the pose engine 320, the image processing engine 324, and/or the rendering engine 326 as described herein.

In some examples, the image sensor 302 can capture image data and can generate images (also referred to as frames) based on the image data and/or can provide the image data or frames to the pose engine 320, the image processing engine 324, and/or the rendering engine 326 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 302 (and/or other camera of the system 300) can be configured to also capture depth information. For example, in some implementations, the image sensor 302 (and/or other camera) can include an RGB-depth (RGB-D) camera. In some cases, the system 300 can include one or more depth sensors (not shown) that are separate from the image sensor 302 (and/or other camera) and that can capture depth information. For instance, such a depth sensor can obtain depth information independently from the image sensor 302. In some examples, a depth sensor can be physically installed in the same general location as the image sensor 302, but may operate at a different frequency or frame rate from the image sensor 302. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The system 300 can also include other sensors in its one or more sensors. The one or more sensors can include one or more accelerometers (e.g., accelerometer 304), one or more gyroscopes (e.g., gyroscope 306), and/or other sensors. The one or more sensors can provide velocity, orientation, and/or other position-related information to the compute components 310. For example, the accelerometer 304 can detect acceleration by the system 300 and can generate acceleration measurements based on the detected acceleration. In some cases, the accelerometer 304 can provide one or more translational vectors (e.g., up/down, left/right, forward/back) that can be used for determining a position or pose of the system 300. The gyroscope 306 can detect and measure the orientation and angular velocity of the system 300. For example, the gyroscope 306 can be used to measure the pitch, roll, and yaw of the system 300. In some cases, the gyroscope 306 can provide one or more rotational vectors (e.g., pitch, yaw, roll). In some examples, the image sensor 302 and/or the pose engine 320 can use measurements obtained by the accelerometer 304 (e.g., one or more translational vectors) and/or the gyroscope 306 (e.g., one or more rotational vectors) to calculate the pose of the system 300. As previously noted, in other examples, the system 300 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the system 300, using a combination of one or more accelerometers, one or more gyroscopes, and/or one or more magnetometers. In some examples, the one or more sensors can output measured information associated with the capture of an image captured by the image sensor 302 (and/or other camera of the system 300) and/or depth information obtained using one or more depth sensors of the system 300.

The output of one or more sensors (e.g., the accelerometer 304, the gyroscope 306, one or more IMUs, and/or other sensors) can be used by the pose engine 320 to determine a pose of the system 300 (also referred to as the head pose) and/or the pose of the image sensor 302 (or other camera of the system 300). In some cases, the pose of the system 300 and the pose of the image sensor 302 (or other camera) can be the same. The pose of image sensor 302 refers to the position and orientation of the image sensor 302 relative to a frame of reference (e.g., with respect to the object). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g., roll, pitch, and yaw relative to the same frame of reference). In some implementations, the camera pose can be determined for 3-Degrees Of Freedom (3DoF), which refers to the three angular components (e.g., roll, pitch, and yaw).

In some cases, a device tracker (not shown) can use the measurements from the one or more sensors and image data from the image sensor 302 to track a pose (e.g., a 6DoF pose) of the system 300. For example, the device tracker can fuse visual data (e.g., using a visual tracking solution) from the image data with inertial data from the measurements to determine a position and motion of the system 300 relative to the physical world (e.g., the scene) and a map of the physical world. As described below, in some examples, when tracking the pose of the system 300, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the system 300 within the scene and the 3D map of the scene, etc. The 3D map can provide a digital representation of a scene in the real/physical world. In some examples, the 3D map can anchor location-based objects and/or content to real-world coordinates and/or objects. The system 300 can use a mapped scene (e.g., a scene in the physical world represented by, and/or associated with, a 3D map) to merge the physical and virtual worlds and/or merge virtual content or objects with the physical environment.

In some aspects, the pose (also referred to as a camera pose) of image sensor 302 and/or the system 300 as a whole can be determined and/or tracked by the compute components 310 using a visual tracking solution based on images captured by the image sensor 302 (and/or other camera of the system 300). For instance, in some examples, the compute components 310 can perform tracking using computer vision-based tracking, model-based tracking, and/or simultaneous localization and mapping (SLAM) techniques. For instance, the compute components 310 can perform SLAM or can be in communication (wired or wireless) with a SLAM system (not shown in FIG. 3), such as the SLAM system 400 of FIG. 4. SLAM refers to a class of techniques where a map of an environment (e.g., a map of an environment being modeled by system 300) is created while simultaneously tracking the pose of a camera (e.g., image sensor 302) and/or the system 300 relative to that map. The map can be referred to as a SLAM map, and can be three-dimensional (3D). The SLAM techniques can be performed using color or grayscale image data captured by the image sensor 302 (and/or other camera of the system 300), and can be used to generate estimates of 6DoF pose measurements of the image sensor 302 and/or the system 300. Such a SLAM technique configured to perform 6DoF tracking can be referred to as 6DoF SLAM. In some cases, the output of the one or more sensors (e.g., the accelerometer 304, the gyroscope 306, one or more IMUs, and/or other sensors) can be used to estimate, correct, and/or otherwise adjust the estimated pose.

In some cases, the 6DoF SLAM (e.g., 6DoF tracking) can associate features (e.g., keypoints) observed from certain input images from the image sensor 302 (and/or other camera or sensor) to the SLAM map. For example, 6DoF SLAM can use feature point associations from an input image (or other sensor data, such as a radar sensor, LIDAR sensor, etc.) to determine the pose (position and orientation) of the image sensor 302 and/or system 300 for the input image. 6DoF mapping can also be performed to update the SLAM map. In some cases, the SLAM map maintained using the 6DoF SLAM can contain 3D feature points (e.g., keypoints) triangulated from two or more images. For example, keyframes can be selected from input images or a video stream to represent an observed scene. For every keyframe, a respective 6DoF camera pose associated with the image can be determined. The pose of the image sensor 302 and/or the system 300 can be determined by projecting features (e.g., feature points or keypoints) from the 3D SLAM map into an image or video frame and updating the camera pose from verified 2D-3D correspondences.

In one illustrative example, the compute components 310 can extract feature points (e.g., keypoints) from certain input images (e.g., every input image, a subset of the input images, etc.) or from each keyframe. A feature point (also referred to as a keypoint or registration point) as used herein is a distinctive or identifiable part of an image, such as a part of a hand, an edge of a table, among others. Features extracted from a captured image can represent distinct feature points in three-dimensional space (e.g., coordinates on X, Y, and Z-axes), and every feature point can have an associated feature location. The feature points in keyframes either match (are the same or correspond to) or fail to match the feature points of previously-captured input images or keyframes. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or keyframe, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

In some cases, the system 300 can also track the hand and/or fingers of the user to allow the user to interact with and/or control virtual content in a virtual environment. For example, the system 300 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 4:
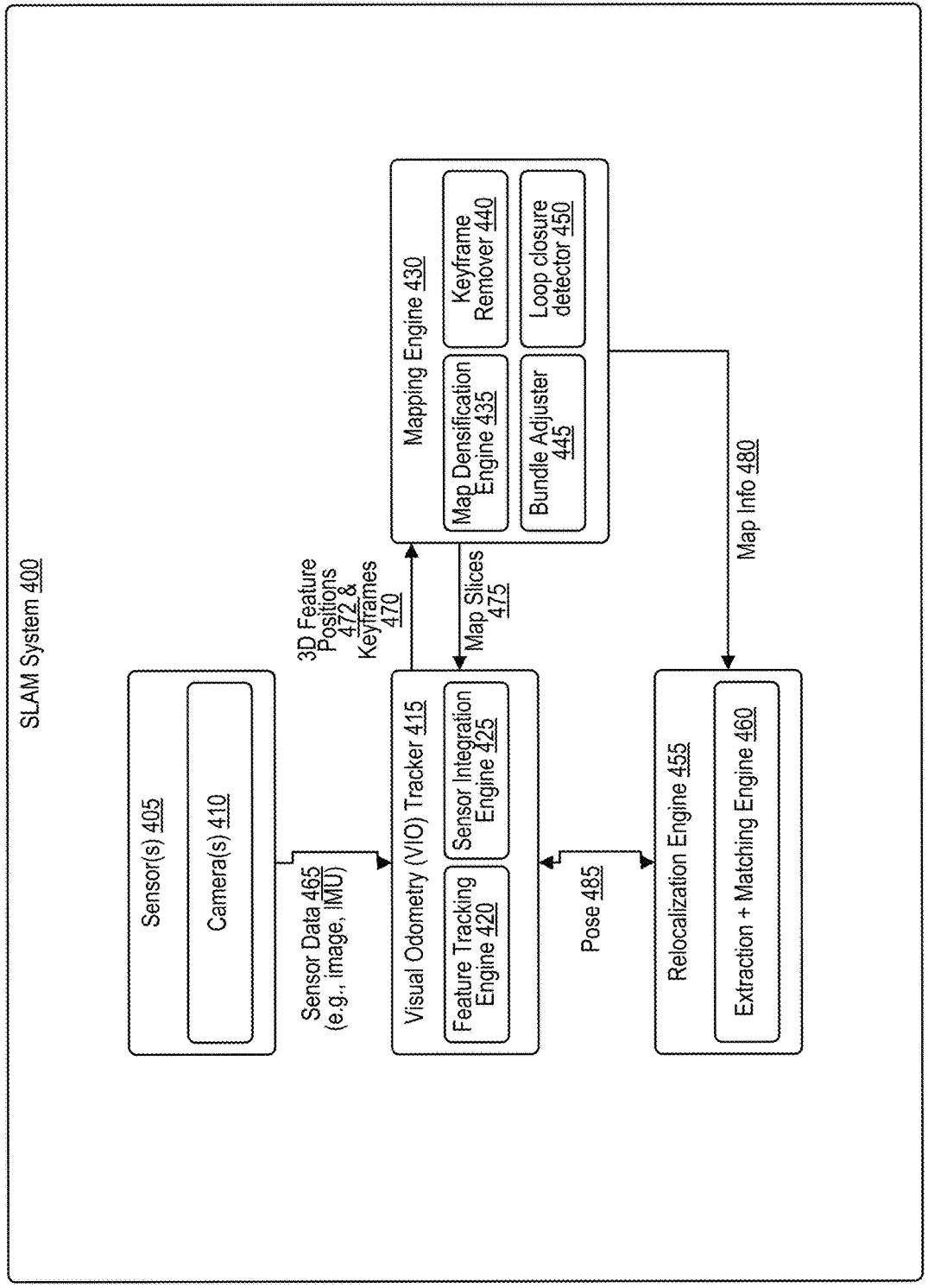
FIG. 4 is a block diagram illustrating an architecture of a simultaneous localization and mapping (SLAM) device, in accordance with some examples.

FIG. 4 is a block diagram illustrating an architecture of a simultaneous localization and mapping (SLAM) system 400. In some examples, the SLAM system 400 can be, can include, or can be a part of the system 300 of FIG. 3. In some examples, the SLAM system 400 can be, can include, or can be a part of an XR device, an autonomous vehicle, a vehicle, a computing system of a vehicle, a wireless communication device, a mobile device or handset (e.g., a mobile telephone or so-called "smart phone" or other mobile device), a wearable device (e.g., a network-connected watch), a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, a robot, another device, or any combination thereof.

The SLAM system 400 of FIG. 4 can include, or be coupled to, each of one or more sensors 405. The one or more sensors 405 can include one or more cameras 410. Each of the one or more cameras 410 may include an image capture device, an image processing device (e.g., processor 1310 of FIG. 13), an image capture and processing system, another type of camera, or a combination thereof. Each of the one or more cameras 410 may be responsive to light from a particular spectrum of light. The spectrum of light may be a subset of the electromagnetic (EM) spectrum. For example, each of the one or more cameras 410 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or some combination thereof.

The one or more sensors 405 can include one or more other types of sensors other than cameras 410, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, the one or more sensors 405 can include any combination of sensors of the system 300 of FIG. 3.

The SLAM system 400 of FIG. 4 can include a visual-inertial odometry (VIO) tracker 415. The term visual-inertial odometry may also be referred to herein as visual odometry. The VIO tracker 415 can receive sensor data 465 from the one or more sensors 405. For instance, the sensor data 465 can include one or more images captured by the one or more cameras 410. The sensor data 465 can include other types of sensor data from the one or more sensors 405, such as data from any of the types of sensors 405 listed herein. For instance, the sensor data 465 can include inertial measurement unit (IMU) data from one or more IMUs of the one or more sensors 405.

Upon receipt of the sensor data 465 from the one or more sensors 405, the VIO tracker 415 can perform feature detection, extraction, and/or tracking using a feature tracking engine 420 of the VIO tracker 415. For instance, where the sensor data 465 includes one or more images captured by the one or more cameras 410 of the SLAM system 400, the VIO tracker 415 can identify, detect, and/or extract features in each image. Features may include visually distinctive points in an image, such as portions of the image depicting edges and/or corners. The VIO tracker 415 can receive sensor data 465 periodically and/or continually from the one or more sensors 405, for instance by continuing to receive more images from the one or more cameras 410 as the one or more cameras 410 capture a video, where the images are video frames of the video. The VIO tracker 415 can generate descriptors for the features. Feature descriptors can be generated at least in part by generating a description of the feature as depicted in a local image patch extracted around the feature. In some examples, a feature descriptor can describe a feature as a collection of one or more feature vectors.

The VIO tracker 415, in some cases with the mapping engine 430 and/or the relocalization engine 455, can associate the plurality of features with a map of the environment based on such feature descriptors. The feature tracking engine 420 of the VIO tracker 415 can perform feature tracking by recognizing features in each image that the VIO tracker 415 already previously recognized in one or more previous images, in some cases based on identifying features with matching feature descriptors in different images. The feature tracking engine 420 can track changes in one or more positions at which the feature is depicted in each of the different images. For example, the feature extraction engine can detect a particular corner of a room depicted in a left side of a first image captured by a first camera of the cameras 410. The feature extraction engine can detect the same feature (e.g., the same particular corner of the same room) depicted in a right side of a second image captured by the first camera. The feature tracking engine 420 can recognize that the features detected in the first image and the second image are two depictions of the same feature (e.g., the same particular corner of the same room), and that the feature appears in two different positions in the two images. The VIO tracker 415 can determine, based on the same feature appearing on the left side of the first image and on the right side of the second image that the first camera has moved, for example if the feature (e.g., the particular corner of the room) depicts a static portion of the environment.

The VIO tracker 415 can include a sensor integration engine 425. The sensor integration engine 425 can use sensor data from other types of sensors 405 (other than the cameras 410) to determine information that can be used by the feature tracking engine 420 when performing the feature tracking. For example, the sensor integration engine 425 can receive IMU data (e.g., which can be included as part of the sensor data 465) from an IMU of the one or more sensors 405. The sensor integration engine 425 can determine, based on the IMU data in the sensor data 465, that the SLAM system 400 has rotated 15 degrees in a clockwise direction from acquisition or capture of a first image and capture to acquisition or capture of the second image by a first camera of the cameras 410. Based on this determination, the sensor integration engine 425 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 420 can take this expectation into consideration in tracking features between the first image and the second image.

Based on the feature tracking by the feature tracking engine 420 and/or the sensor integration by the sensor integration engine 425, the VIO tracker 415 can determine a 3D feature positions 472 of a particular feature. The 3D feature positions 472 can include one or more 3D feature positions and can also be referred to as 3D feature points. The 3D feature positions 472 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. In some aspects, the VIO tracker 415 can also determine one or more keyframes 470 (referred to hereinafter as keyframes 470) corresponding to the particular feature. A keyframe (from one or more keyframes 470) corresponding to a particular feature may be an image in which the particular feature is clearly depicted. In some examples, a keyframe (from the one or more keyframes 470) corresponding to a particular feature may be an image in which the particular feature is clearly depicted. In some examples, a keyframe corresponding to a particular feature may be an image that reduces uncertainty in the 3D feature positions 472 of the particular feature when considered by the feature tracking engine 420 and/or the sensor integration engine 425 for determination of the 3D feature positions 472. In some examples, a keyframe corresponding to a particular feature also includes data about the pose 485 of the SLAM system 400 and/or the camera(s) 410 during capture of the keyframe. In some examples, the VIO tracker 415 can send 3D feature positions 472 and/or keyframes 470 corresponding to one or more features to the mapping engine 430. In some examples, the VIO tracker 415 can receive map slices 475 from the mapping engine 430. The VIO tracker 415 can feature information within the map slices 475 for feature tracking using the feature tracking engine 420.

Based on the feature tracking by the feature tracking engine 420 and/or the sensor integration by the sensor integration engine 425, the VIO tracker 415 can determine a pose 485 of the SLAM system 400 and/or of the cameras 410 during capture of each of the images in the sensor data 465. The pose 485 can include a location of the SLAM system 400 and/or of the cameras 410 in 3D space, such as a set of coordinates along three different axes that are perpendicular to one another (e.g., an X coordinate, a Y coordinate, and a Z coordinate). The pose 485 can include an orientation of the SLAM system 400 and/or of the cameras 410 in 3D space, such as pitch, roll, yaw, or some combination thereof. In some examples, the VIO tracker 415 can send the pose 485 to the relocalization engine 455. In some examples, the VIO tracker 415 can receive the pose 485 from the relocalization engine 455.

The SLAM system 400 also includes a mapping engine 430. The mapping engine 430 can generate a 3D map of the environment based on the 3D feature positions 472 and/or the keyframes 470 received from the VIO tracker 415. The mapping engine 430 can include a map densification engine 435, a keyframe remover 440, a bundle adjuster 445, and/or a loop closure detector 450. The map densification engine 435 can perform map densification, in some examples, increase the quantity and/or density of 3D coordinates describing the map geometry. The keyframe remover 440 can remove keyframes, and/or in some cases add keyframes. In some examples, the keyframe remover 440 can remove keyframes 470 corresponding to a region of the map that is to be updated and/or whose corresponding confidence values are low. The bundle adjuster 445 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 450 can recognize when the SLAM system 400 has returned to a previously mapped region, and can use such information to update a map slice and/or reduce the uncertainty in certain 3D feature points or other points in the map geometry.

The mapping engine 430 can output map slices 475 to the VIO tracker 415. The map slices 475 can represent 3D portions or subsets of the map. The map slices 475 can include map slices 475 that represent new, previously-unmapped areas of the map. The map slices 475 can include map slices 475 that represent updates (or modifications or revisions) to previously-mapped areas of the map. The mapping engine 430 can output map information 480 to the relocalization engine 455. The map information 480 can include at least a portion of the map generated by the mapping engine 430. The map information 480 can include one or more 3D points making up the geometry of the map, such as one or more 3D feature positions 472. The map information 480 can include one or more keyframes 470 corresponding to certain features and certain 3D feature positions 472.

The SLAM system 400 also includes a relocalization engine 455. The relocalization engine 455 can perform relocalization, for instance when the VIO tracker 415 fail to recognize more than a threshold number of features in an image, and/or the VIO tracker 415 loses track of the pose 485 of the SLAM system 400 within the map generated by the mapping engine 430. The relocalization engine 455 can perform relocalization by performing extraction and matching using an extraction and matching engine 460. For instance, the extraction and matching engine 460 can by extract features from an image captured by the cameras 410 of the SLAM system 400 while the SLAM system 400 is at a current pose 485, and can match the extracted features to features depicted in different keyframes 470, identified by 3D feature positions 472, and/or identified in the map information 480. By matching these extracted features to the previously-identified features, the relocalization engine 455 can identify that the pose 485 of the SLAM system 400 is a pose 485 at which the previously-identified features are visible to the cameras 410 of the SLAM system 400, and is therefore similar to one or more previous poses 485 at which the previously-identified features were visible to the cameras 410. In some cases, the relocalization engine 455 can perform relocalization based on wide baseline mapping, or a distance between a current camera position and camera position at which feature was originally captured. The relocalization engine 455 can receive information for the pose 485 from the VIO tracker 415, for instance regarding one or more recent poses of the SLAM system 400 and/or cameras 410, which the relocalization engine 455 can base its relocalization determination on. Once the relocalization engine 455 relocates the SLAM system 400 and/or cameras 410 and thus determines the pose 485, the relocalization engine 455 can output the pose 485 to the VIO tracker 415.

As previously mentioned, examples of XR systems include HMDs, such as AR/VR HMDs. Typical use cases of AR/VR HMDs require online calibration, which estimates how camera parameters (e.g., principle focal length, orientation, etc.) for the HMDs are changing over time. Frequent calibration of HMDs is required to have consistent six degrees of freedom (6DoF) performance for the HMDs. The HMDs are generally calibrated in the factory during the manufacturing of the HMDs and, as such, the camera parameters are known. However, over time, during the operation of the HMDs, these values can change. As such, additional calibrations of the HMDs can be needed over the course of the lifetime use of the HMDs. During the calibration of the HMDs, calibration parameters are determined. The calibration parameters can include, but are not limited to, camera intrinsic parameters ($K_{cam_k}$), camera extrinsic parameters ($K_{cam_0-cam_k}$), a camera-IMU placement ($K_{imu-cam_0}$) (e.g., relative position and orientation of the IMU to the camera of the HMD), an IMU scale factor (e.g., a ratio that describes the error between a change in the IMU sensor output in response to a change in the input being measured), and/or an IMU misalignment (e.g., the amount of misalignment relative to the IMU axes of pitch, yaw, and roll).

Generally, existing approaches for the calibration of VR/AR HMDs employ a joint optimization of all the calibration parameters along with keypoint positions ($T_{kp_i}$) (e.g., a 3D position for each of the keypoints, which may each be in the form of a point or a line) and keyframe poses ($T_{kf_j}$, $R_{kf_j}$) by minimizing a reprojection error and a frame pose error measured by IMUs (e.g., an IMU propagation error). Each of the IMUs may include an accelerometer, such as accelerometer 304 of FIG. 3, and a gyroscope, such as gyroscope 306 of FIG. 3. In one or more examples, the calibration formula is:

$$\operatorname{argmin} \sum\nolimits_{k=1}^{N_k} \sum\nolimits_{j=1}^{N_j} \sum\nolimits_{i=1}^{N_i} \left( \left(z_i - h_i\left(T_{kf_j}, R_{kf_j}, T_{kp_i}, K_{imu-cam_0}, K_{cam_k}, K_{cam_0-cam_k}\right)\right)^2 \right) + \sum\nolimits_{j=1}^{N_{Imu}} \left( \left(T_{kf-Imu_j} - T_{kf_j}\right)^2 + \left(R_{kf-Imu_j} - R_{kf_j}\right)^2 \right)$$

equation (a)

The reprojection error is the first half of equation (a), and the IMU propagation error (e.g., the frame pose error measured by IMUs) is the second half of equation (a). In equation (a), $z_i$ is the measurement of a key point, $h_i$ is the reprojection model, i is the keypoint number, $T_{kf-Imu_j}$ is a position (translation) of a keyframe measured by one IMU, $R_{kf-Imu_j}$ is an orientation (rotation) of a keyframe measured by one IMU, and j is the keyframe number.

However, there can be challenges with the calibration model of equation (a). For example, in order to estimate the calibration parameters accurately, the noise in the keypoint measurements and the IMU measurements should be low, and the system should be observable (e.g., there is a sufficient number of measurements, not including redundant measurements, such that the system is solvable). Some challenges of the calibration model of equation (a) can include, but are not limited to, that the scale is not observable within an unknown environment (e.g., when scaling up or scaling down), the feature measurement noise can vary based on the scene and tracked features, the observability of the system can depend upon the motion performed and the position of the keypoints during the optimization process, and the performed motion can sometimes be subjective and may not be enough to observe all of the parameters. Not knowing some of the calibration parameters can result in a suboptimal optimization of the calibration parameters, which can lead to a suboptimal performance of the HMD. As such, an improved solution (e.g., other than utilizing equation (a)) for calibration of AR/VR HMDs can be beneficial.

In one or more aspects, the systems and techniques provide an improved solution for calibrating HMDs, such as AR/VR HMDs. In particular, the systems and techniques provide a solution for using HMD hinge motion to calibrate the HMD, such as an AR/VR HMD. HMDs each have a hinge (e.g., a display hinge), which is used to move (rotate) a display of the HMD.

In one or more aspects, the systems and techniques can include a hinge movement detector (e.g., an optical encoder or an end-to-end detector) coupled to a display hinge (or other movement mechanism) used to tilt a display of the HMD and to allow for constrained display movement along or about one axis. Measurements obtained during movement of the display by the hinge can be used to calibrate the HMD (e.g., to determine calibration parameters for the HMD). In some aspects, the limits of the hinge movement at the extreme ends of the movement can be used to identify pose constraints (e.g., round trip identity pose constraint), based on known start and stop points for the movement of the hinge, that can be utilized for the calibration.

Figure 5:
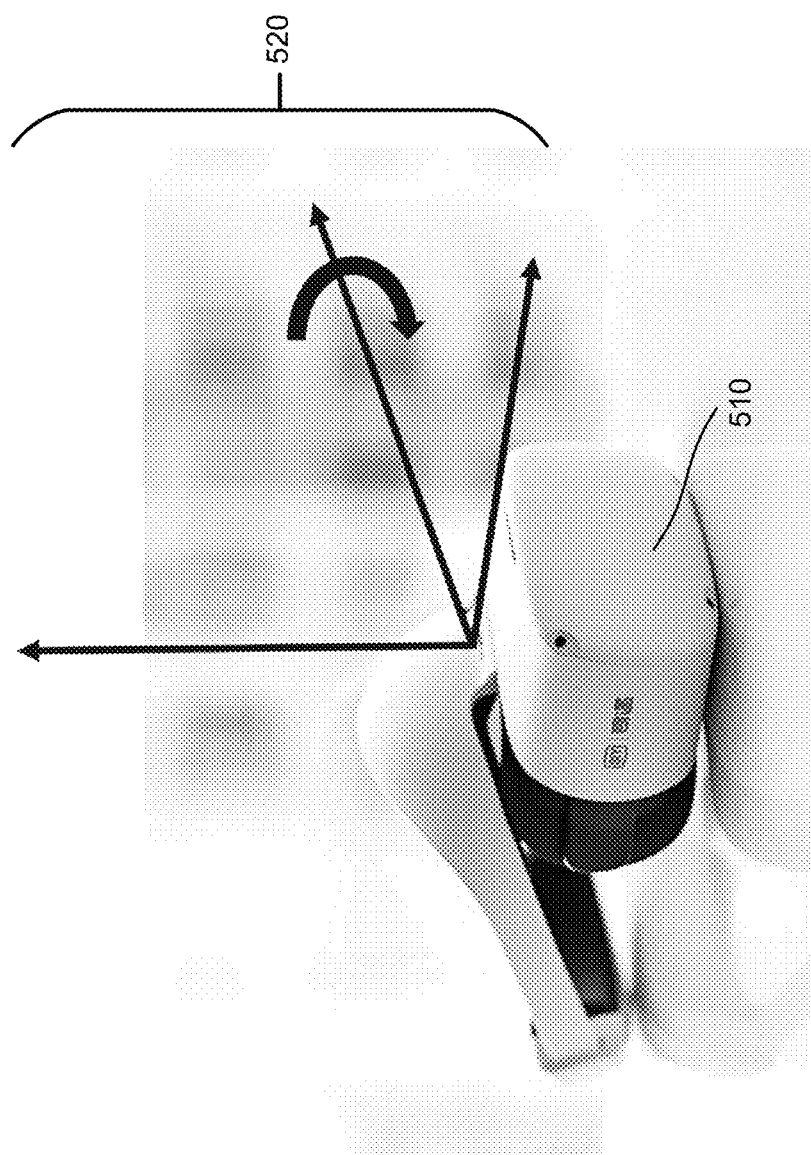
FIG. 5 is a diagram illustrating an example of a first type of HMD, in accordance with some examples.
Figure 6:
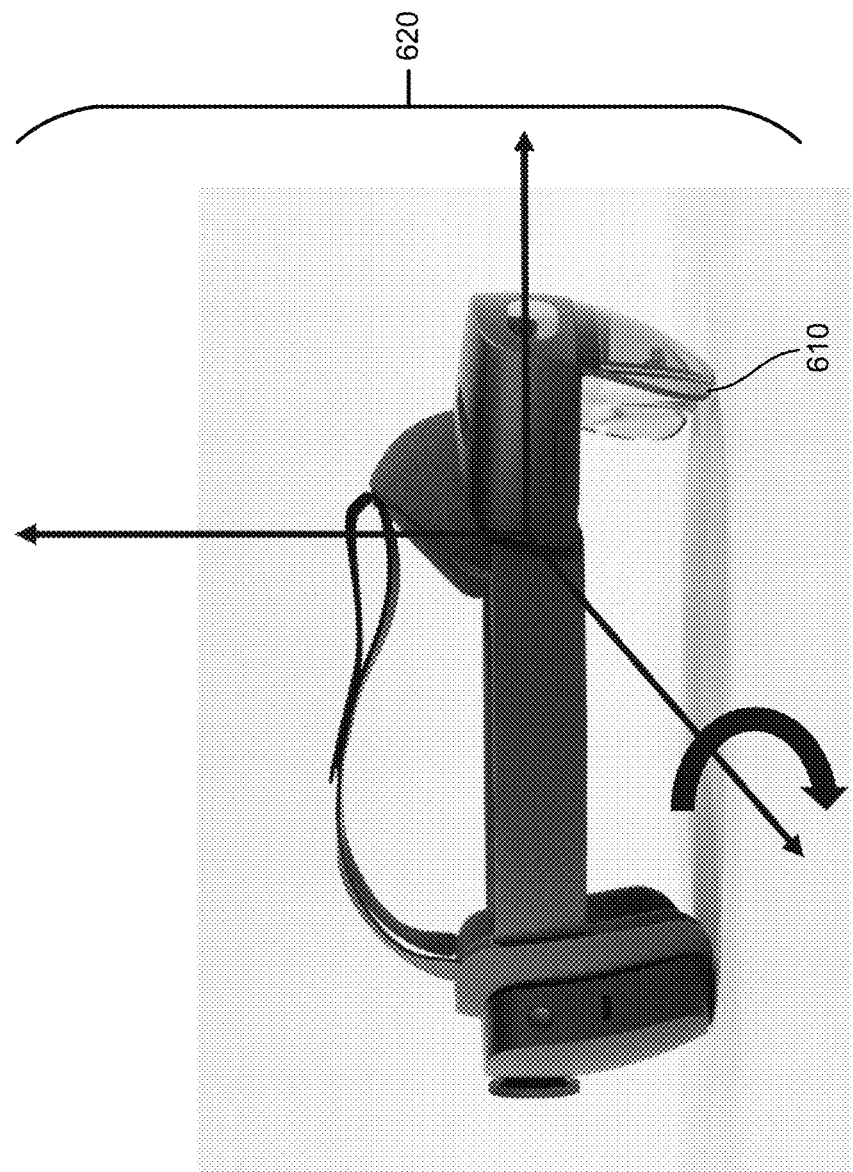
FIG. 6 is a diagram illustrating an example of a second type of HMD, in accordance with some examples.
Figure 7:
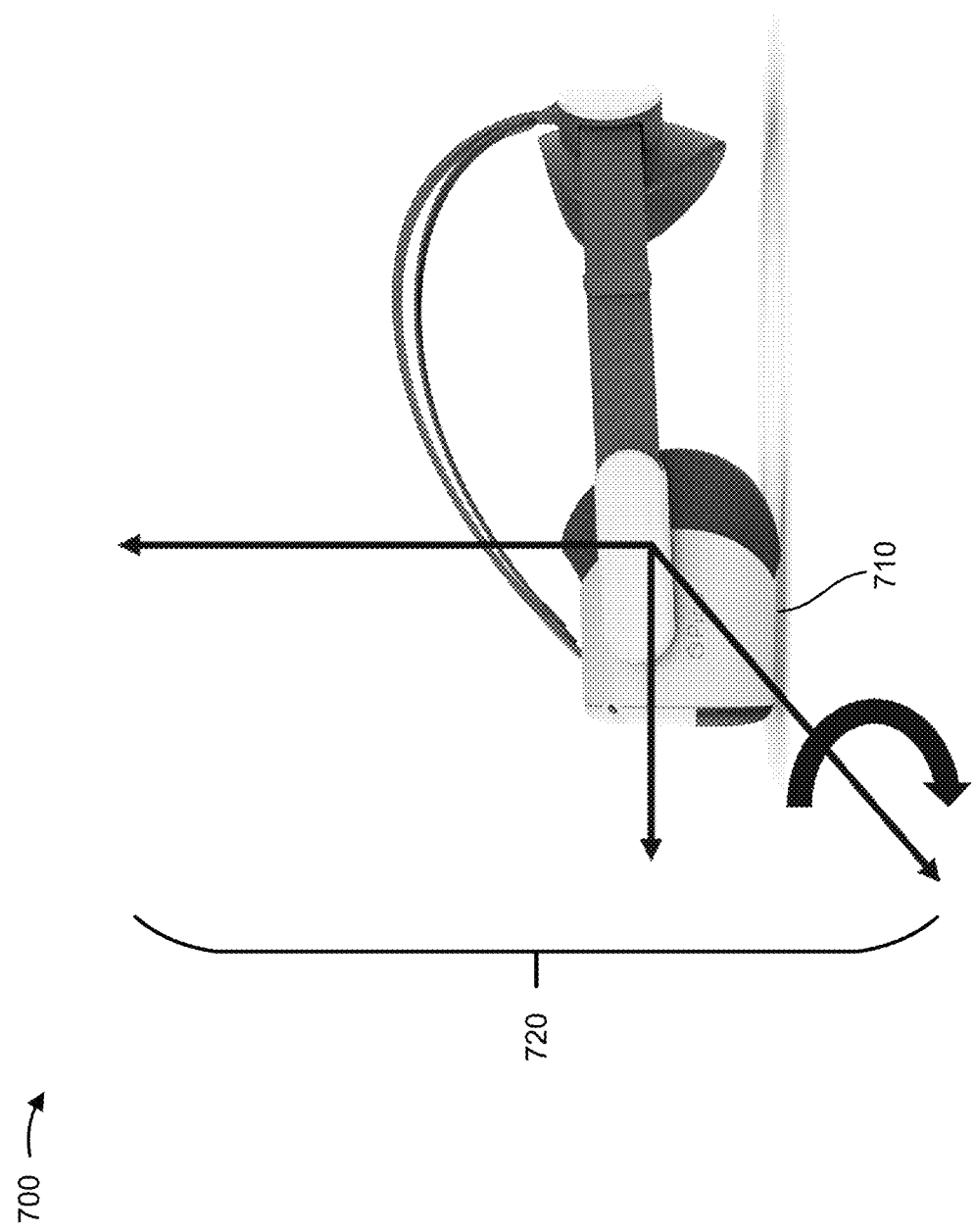
FIG. 7 is a diagram illustrating an example of a third type of HMD, in accordance with some examples.

FIGS. 5, 6, and 7 show examples of different types of HMDs with their associated display hinge axes. In particular, FIG. 5 is a diagram illustrating an example of a first type of HMD 500. In particular, in FIG. 5 the HMD 500 shown is a QIYU 2 HMD. The HMD 500 includes a display 510 that is mounted onto a frame of the HMD 500 via a hinge (e.g., a display hinge). The hinge axes 520 for hinge of the HMD 500 are also shown. The display 510 can move (rotate) in one axis (e.g., the pitch axis) of the hinge axes 520 as is shown by the curved arrow in FIG. 5.

FIG. 6 is a diagram illustrating an example of a second type of HMD 600. In particular, in FIG. 6 the HMD 600 shown is a Hololens 2 HMD. The HMD 600 includes a display 610 that is mounted onto a frame of the HMD 600 via a hinge (e.g., a display hinge). The hinge axes 620 for hinge of the HMD 600 are shown. The display 610 can move (rotate) in one axis (e.g., the pitch axis) of the hinge axes 620 shown by the curved arrow in FIG. 6.

FIG. 7 is a diagram illustrating an example of a third type of HMD 700. In particular, in FIG. 7 the HMD 700 shown is a Neo 3 HMD. The HMD 700 includes a display 710 that is mounted onto a frame of the HMD 700 via a hinge (e.g., a display hinge). The hinge axes 720 for hinge of the HMD 700 are shown. The display 710 can move (rotate) in one axis (e.g., the pitch axis) of the hinge axes 720 as shown by the curved arrow in FIG. 7.

In one or more aspects, the hinge (e.g., display hinge) of an HMD allows for the display of the HMD to rotate about a pitch axis of the hinge axes and for the display to have a limited movement. Due to the limited movement of the display along or about the one axis (e.g., the pitch axis), the display movement can be measured from one end (e.g., one extreme end of the pitch axis) to another end (e.g., the other extreme end of the pitch axis) continuously by a hinge movement tracker (e.g., a device used to track the motion of the hinge), which can be included (implemented) within the HMD. In one or more examples, an optical encoder (e.g., a type of rotary encoder that uses a sensor to identify position change as light passes through a patterned encoder wheel or disk) or an end-to-end detector (e.g., one or more IMUs, an audio-based snap detector, an active edge sensor, or other device) can be employed for the hinge movement tracker of the HMD. The measured movement of the display can be used to calibrate the HMD. During the display movement, sensors of the HMD can obtain sensor measurements, which can also be utilized for the calibration. In one or more examples, the sensors can include, but are not limited to, IMU sensors, image sensors, and/or camera sensors.

After the movement of the display along or about the pitch axis of the hinge has been measured, the HMD can be calibrated. In one or more examples, the HMD can be calibrated either offline (e.g., not during operation of XR) or online (e.g., during operation of XR), and the HMD can be calibrated either within the factory during the manufacturing of the HMD or by a user of the HMD.

In one or more aspects, the disclosed calibration for an HMD (e.g., a VR/AR HMD) adds additional constraints (e.g., hinge movement constraints, such as rotation error and translation error) to the calibration formula of equation (a). The resultant calibration formula can be utilized when the hinge movement of the display of the HMD is measured continuously over time. In particular, the disclosed calibration for an HMD minimizes the reprojection error of the first half of equation (a) and the IMU propagation error (e.g., the frame pose error measured by IMUs) of the second half of equation (a). The disclosed calibration for an HMD additionally minimizes a rotation error and a translation error, based on the hinge movement. As such, in one or more aspects, the disclosed calibration formula is:

equation (b)

$$\operatorname*{argmin} \sum_{k=1}^{N_k} \sum_{j=1}^{N_j} \sum_{i=1}^{N_i} \left( \left( z_i - h_i(T_{kf_j}, R_{kf_j}, T_{kp_i}, K_{imu-cam_0}, K_{cam_k}, K_{cam_0-cam_k}) \right)^2 \right) +$$

$$\sum_{j=1}^{N_{Imu}} \left( (T_{f-Imu_j} - T_{f_j})^2 + (R_{f-Imu_j} - R_{f_j})^2 \right) + \sum_{i=1}^{n} \left\| R_{b_0 b_i} - R_{sb_0}^T R_{sb_i} \right\|_2 +$$

$$\sum_{i=1}^{n} \left\| T_{hb_i} - (R_{hb} R_{sb_0}^T (T_{sb_i} - T_{sb_0})) \right\|_2$$

The reprojection error is represented by the term $\Sigma_{k=1}^{N_k} \Sigma_{j=1}^{N_j} \Sigma_{i=1}^{N_i} ((z_i - h_i(T_{kf_j}, R_{kf_j}, T_{kp_i}, K_{imu-cam_0}, K_{cam_k}, K_{cam_0-cam_k}))^2)$ of equation (b), the IMU propagation error (e.g., the frame pose error measured by IMUs) is represented by the term $\Sigma_{j=1}^{N_{Imu}} (T_{f-Imu_j} - T_{f_j})^2 + (R_{f-Imu_j} - R_{f_j})^2)$ of equation (b), the rotation error is represented by the term $\Sigma_{i=1}^{n} \| R_{b_0 b_i} - R_{sb_0}^T R_{sb_i} \|^2$ of equation (b), and the translation error is represented by the term $\Sigma_{i=1}^{n} \| T_{hb_i} - (R_{hb} R_{sb_0}^T (T_{sb_i} - T_{sb_0})) \|_2$ of equation (b).

In one or more examples, the calibration formula of equation (b) can be utilized when the hinge movement of the display of the HMD is measured continuously over time. The rotation error can be computed by:

$$\sum_{i=1}^{n} \left\| R_{b_0 b_i} - R_{sb_0}^T R_{sb_i} \right\|_2 \quad \text{equation (1)}$$

The translation error (e.g., if the hinge to body placement is known) can be computed by:

$$\sum_{i=1}^{n} \left\| T_{hb_i} - (R_{hb} R_{sb_0}^T (T_{sb_i} - T_{sb_0})) \right\|_2 \quad \text{equation (2)}$$

Figure 8:
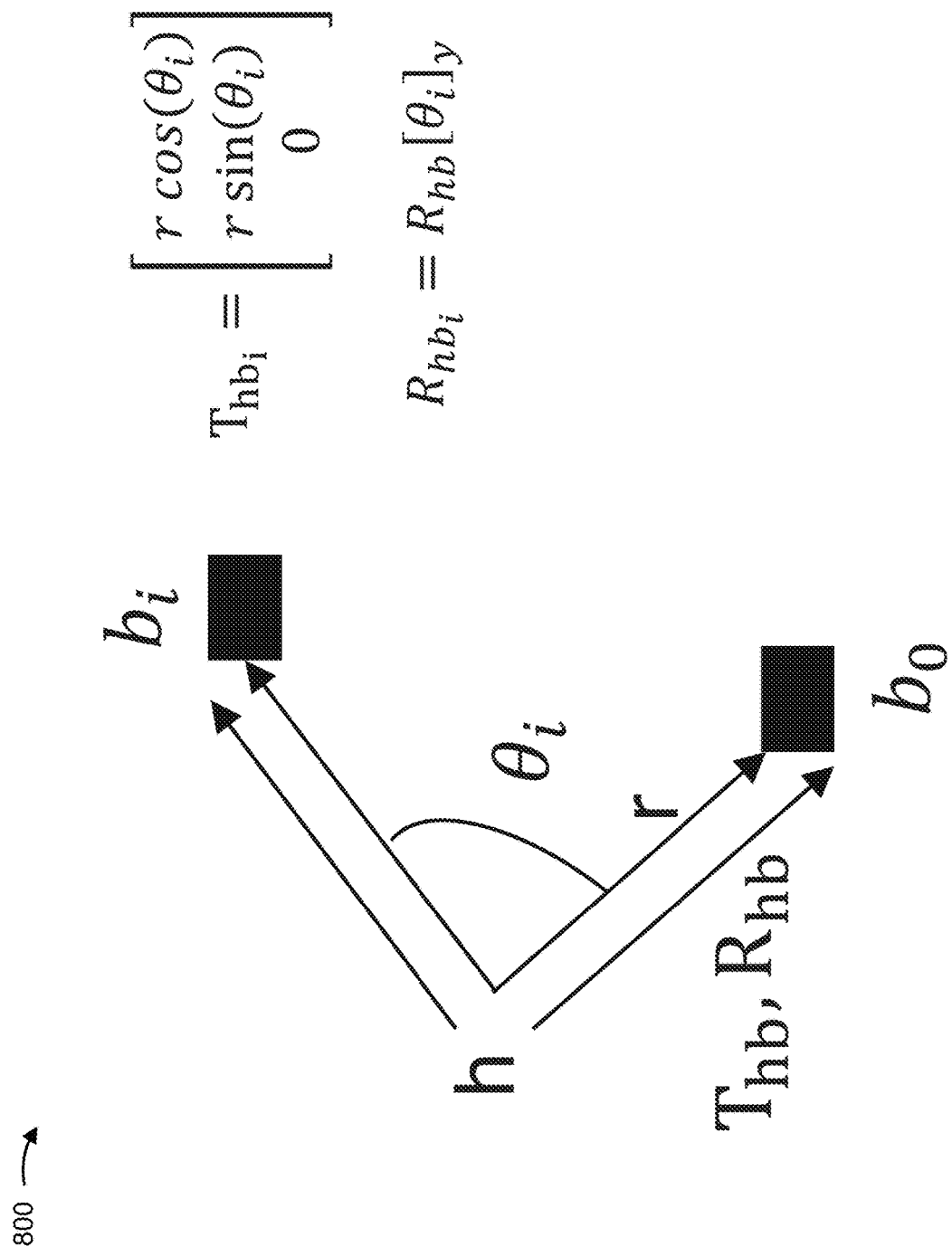
FIG. 8 is a diagram illustrating geometry of an example of a hinge for a display of an HMD, in accordance with some examples.

The rotation error equation, equation (1), and the translation error equation, equation (2), relate the hinge motion with 6DoF motion (e.g., the camera motion). In the preceding equations, $b_0$ represents the position of the camera, IMU, and/or body of the HMD (e.g., measured by 6DOF) when the display is tilted down to the extreme lower position of the pitch axis of the hinge (e.g., as shown in FIG. 8); $b_i$ represents the position of the camera, IMU, and/or body of the HMD (e.g., measured by 6DOF) when the display is moving (sweeping) along or about the pitch axis of the hinge of the over time (e.g., as shown in FIG. 8); $R_{b_0 b_i}$ is the angle $[\theta_i]_y$ of the hinge rotation in the pitch axis (e.g., as shown in FIG. 8); $T_{hb}$, $R_{hb}$ are rigidly fixed and are the position of camera, IMU, and/or body of the HMD (e.g., measured by 6DOF) with respect to a hinge frame of the hinge; $T_{sb_i}$, $R_{sb_i}$ are the camera, IMU, and/or body position with respect to the spatial frame at time $t_i$; $T_{sb_0}$, $R_{sb_0}$ are the camera, IMU, and/or body position with respect to the spatial frame at time $t_0$, when the hinge motion will begin; h is the hinge frame; and b is the camera, IMU, and/or body frame During the calibration, $R_{sb_i}$ and $T_{sb_i}$ are the quantities that are also estimated during the optimization. $T_{hb}$, $R_{hb}$ can be measured by the hinge movement tracker (e.g., the optical encoder) during the movement.

FIG. 8 is a diagram illustrating geometry 800 of an example of a hinge for a display of an HMD. In FIG. 8, a hinge frame (h) of a hinge is shown to have an angle $[\theta_i]_y$ of the hinge rotation in the pitch axis. For the geometry 800 of FIG. 8, r is the distance between the hinge and the IMU or the camera. The geometry 800 of FIG. 8 also illustrates some of the other variables contained within the preceding equations.

In one or more aspects, the disclosed calibration for an HMD (e.g., a VR/AR HMD) adds an additional round trip identity pose constraint to the calibration formula of equation (a). The resultant calibration formula does not require an explicit hinge calibration (e.g., the hinge movement of the display of the HMD does not need to be measured continuously over time), but the resultant calibration formula does require that the start point and end point of the pitch axis rotation be identical. For this disclosed calibration, a user can be requested (e.g., via a pop up message displayed on the display of the HMD) to move (flip) the display in a direction upwards to an extreme end of the pitch axis of the hinge and, then, to move (flip) the display in a direction downwards to an opposite extreme end of the pitch axis of hinge. This disclosed calibration for an HMD minimizes the reprojection error of the first half of equation (a) and the IMU propagation error (e.g., the frame pose error measured by IMUs) of the second half of equation (a). This disclosed calibration for an HMD additionally minimizes a round trip identity pose constraint, based on the hinge movement. As such, in one or more aspects, this disclosed calibration formula is:

$$\operatorname{argmin} \sum_{k=1}^{N_k} \sum_{j=1}^{N_j} \sum_{i=1}^{N_i} \left( \left( z_i - h_i\left(T_{kf_j}, R_{kf_j}, T_{kp_i}, K_{imu-cam_0}, K_{cam_k}, K_{cam_0-cam_k}\right) \right)^2 \right) +$$

equation (c)

$$\sum_{j=1}^{N_{Imu}} \left( \left(T_{f-Imu_j} - T_{f_j}\right)^2 + \left(R_{f-Imu_j} - R_{f_j}\right)^2 \right) + \left\| R_{b_0 b_n} - I \right\|_2 + \left\| T_{sb_n} - T_{sb_0} \right\|_2$$

The reprojection error is represented by the term $\Sigma_{k=1}^{N_k} \Sigma_{j=1}^{N_j} \Sigma_{i=1}^{N_i} ((z_i - h_i(T_{kf_j}, R_{kf_j}, T_{kp_i}, K_{imu-cam_0}, K_{cam_k}, K_{cam_0-cam_k}))^2)$ of equation (c), the IMU propagation error (e.g., the frame pose error measured by IMUs) is represented by the term $\Sigma_{j=1}^{N_{Imu}} (T_{f-Imu_j} - T_{f_j})^2 + (R_{f-Imu_j} - R_{f_j})^2)$ of equation (c), and the round trip identity pose constraint is represented by the term $\|R_{b_0 b_n} - I\|_2 + \|T_{sb_n} - T_{sb_0}\|_2$ of equation (c). Equation (c) represents a simplified version of equation (b).

In one or more aspects, for calibrating the HMD, an optical encoder can be implemented within the HMD to measure the hinge rotation continuously. While performing a factory calibration of the HMD, the allowed rotation of the hinge can be measured. Sensors can be placed on or within the HMD to detect when the HMD is moved (tilted) to an exact end position of the pitch axis. In order to ensure that the HMD snaps (tilts) to the exact end position at either end of the pitch axis, tiny magnets can be employed within the HMD. During the calibration of the HMD, the error in the end-to-end hinge rotation (e.g., the rotation of the hinge from one exact end position of the pitch axis to the other exact end position of the pitch axis) can be estimated and a distribution of the errors can be modeled. The distribution of the errors can be used as a prior (e.g., an initial estimate) in the optimization framework (e.g., joint optimization framework 1050 of FIG. 10) for generating the calibration parameters (e.g., calibration parameters 1060 of FIG. 10).

In one or more aspects, one of the biggest challenges for the disclosed HMD calibration (e.g., utilizing equations (b) or (c)) is to detect only hinge motion. Motion detected other than the hinge motion can cause the calibration of the HMD to be inaccurate. In order to ensure that only hinge motion is detected, gyroscopes (gyros) can be employed within the HMD to detect whether (or not) the HMD is moving only along or about the pitch axis of the hinge of the display. In one or more examples, a gyro bias can be estimated when the HMD is stationary. Unbiased gyro measurements can measure a vector orthonormal to the rotation plane of the hinge. As previously mentioned, movement (e.g., rotation) of the hinge is only within one direction (e.g., along or about the pitch axis). When there is only hinge movement present, a gyro can measure a vector orthonormal to the pitch plane. The average of the vector during the rotational motion is:

$$\vec{\omega}_{avg} = \frac{1}{\|\omega\|_2} \sum_{i=1}^{n} [\omega_{x,i} \ \omega_{y,i} \ \omega_{z,i}]$$

equation (d)

If the motion of the HMD is only along or about the pitch axis, all of the samples (e.g., obtained sensor measurements related to motion) should be consistent with the averaged vector such that:

$$\frac{1}{n} \sum_{i=1}^{n} dot(\vec{\omega}_{avg}, [\omega_{x,i} \ \omega_{y,i} \ \omega_{z,i}]) = 1$$

equation (e)

Figure 9:
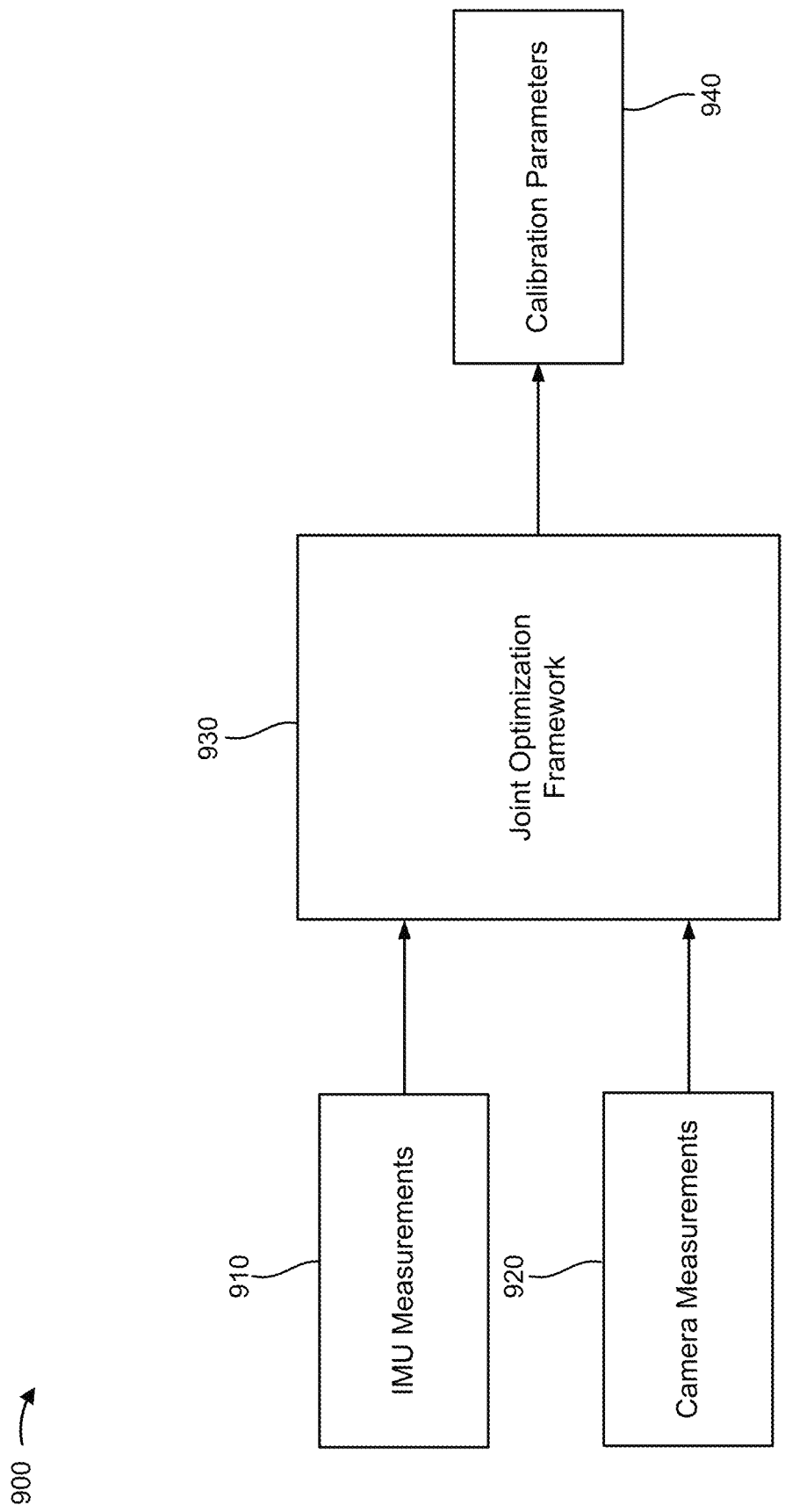
FIG. 9 is a flowchart illustrating an example of a process for determining parameters (e.g., calibration parameters) for an HMD, in accordance with some examples.
Figure 10:
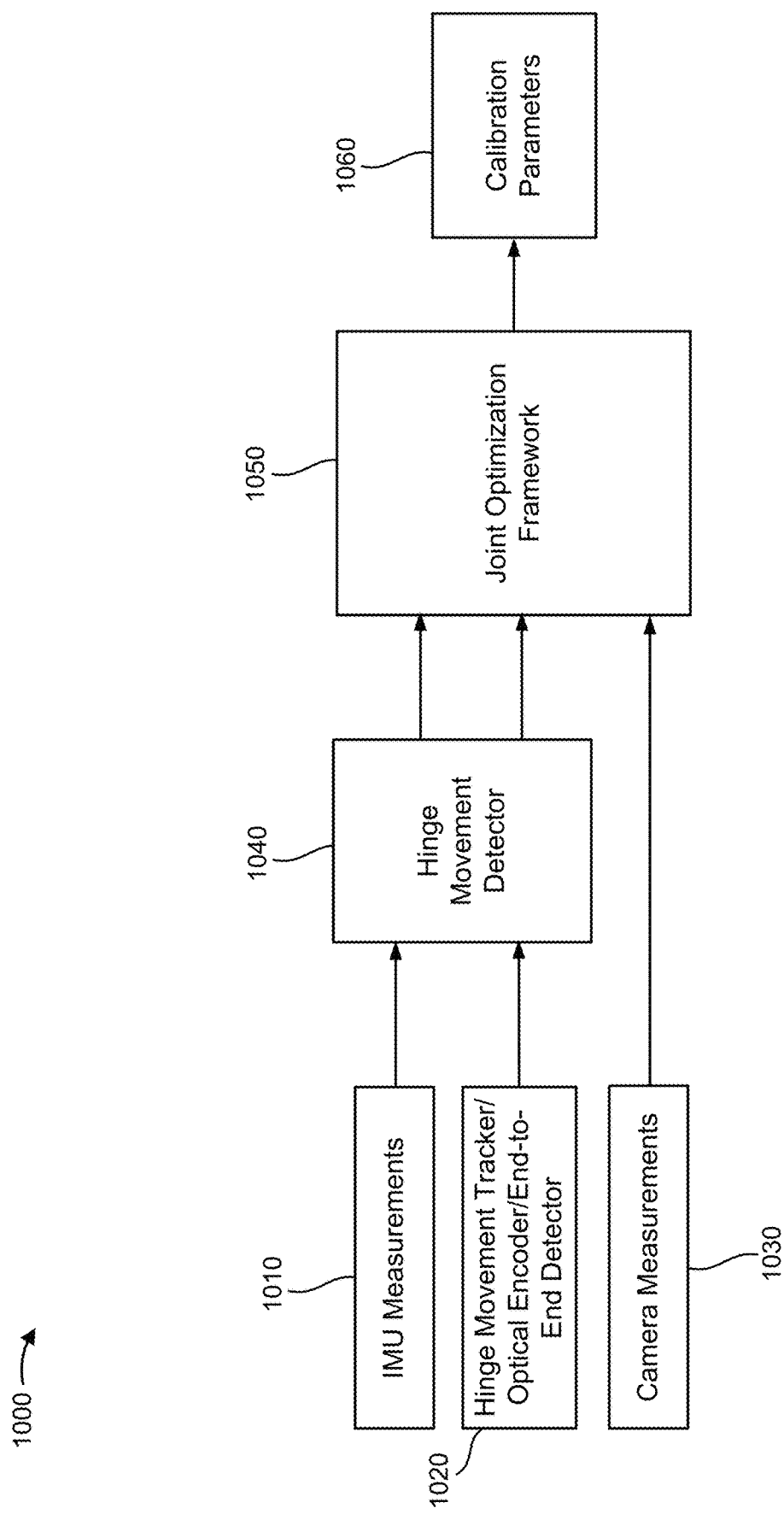
FIG. 10 is a flowchart illustrating an example of the disclosed process for determining parameters (e.g., calibration parameters) for an HMD, where hinge motion is employed for the calibration, in accordance with some examples.

In one or more aspects, FIGS. 9 and 10 show examples of processes (e.g., calibration processes) for determining calibration parameters for an HMD. In particular, FIG. 9 shows an example of an existing process for determining calibration parameters that utilizes equation (a), and FIG. 10 shows an example of the disclosed process for determining calibration parameters that utilizes equations (b) or (c).

Specifically, FIG. 9 is a flowchart illustrating an example of a process 900 for determining calibration parameters for an HMD. In FIG. 9, during operation of the process 900 for calibration of an HMD, sensor measurements (e.g., IMU measurements 910 and camera measurements 920) can be obtained by sensors (e.g., an IMU sensor, such as accelerometer 304 and gyroscope 306 of FIG. 3; and a camera sensor, such as image sensor 302 of FIG. 3 and camera 410 of FIG. 4) of the HMD. The sensor measurements (e.g., IMU measurements 910 and camera measurements 920) can then be inputted into a joint optimization framework 930 for calibration. One or more processors (e.g., compute components 310 of FIG. 3 or processor 1310 of FIG. 13) of the HMD can generate the calibration parameters 940 by processing (optimizing) the calibration algorithm (e.g., equation (a)) using the sensor measurements (e.g., IMU measurements 910 and camera measurements 920).

FIG. 10 is a flowchart illustrating an example of the disclosed process 1000 for determining calibration parameters for an HMD, where hinge motion is employed for the calibration. In FIG. 10, during operation of the process 1000 for calibration of an HMD, while the hinge of the display of the HMD is moving along or about the axis (e.g. pitch axis) of the hinge, sensor measurements (e.g., IMU measurements 1010, hinge movement tracker measurements 1020, and camera measurements 1030) can be obtained by sensors (e.g., an IMU sensor, such as accelerometer 304 and gyroscope 306 of FIG. 3; a hinge movement tracker, such as an optical encoder or an end-to-end detector; and a camera sensor, such as image sensor 302 of FIG. 3 and camera 410 of FIG. 4) of the HMD.

Some of the obtained sensor measurements (e.g., the IMU measurements 1010 and the hinge movement tracker measurements 1020) can be inputted into a hinge movement detector 1040 (e.g., an algorithm) of the HMD. One or more processors (e.g., compute components 310 of FIG. 3 or processor 1310 of FIG. 13) of the HMD can determine whether (or not) the HMD is only moving along or about the axis (e.g., pitch axis) of the hinge by processing equations (d) and (e) (e.g., for detecting the hinge movement) using the inputted sensor measurements (e.g., the IMU measurements 1010 and the hinge movement tracker measurements 1020).

The sensor measurements (e.g., IMU measurements 1010, hinge movement tracker measurements 1020, and camera measurements 1030) can be inputted into a joint optimization framework 1050 for calibration. One or more processors (e.g., compute components 310 of FIG. 3 or processor 1310 of FIG. 13) of the HMD can generate the calibration parameters 1060 by processing (optimizing) the calibration algorithm (e.g., equations (b) or (c)) using the sensor measurements (e.g., IMU measurements 1010, hinge movement tracker measurements 1020, and camera measurements 1030).

In one or more examples, when the one or more processors of the HMD determines (e.g., by using the hinge movement detector 1040) that the HMD is only moving along or about the axis (e.g., pitch axis) of the hinge, the one or more processors will process (optimize) equations (b) or (c) to generate the calibration parameters 1060. However, when the one or more processors of the HMD determines that the HMD is not only moving along or about the axis (e.g., pitch axis) of the hinge, the one or more processors will process (optimize) equation (a) to generate the calibration parameters 1060.

Figure 11:
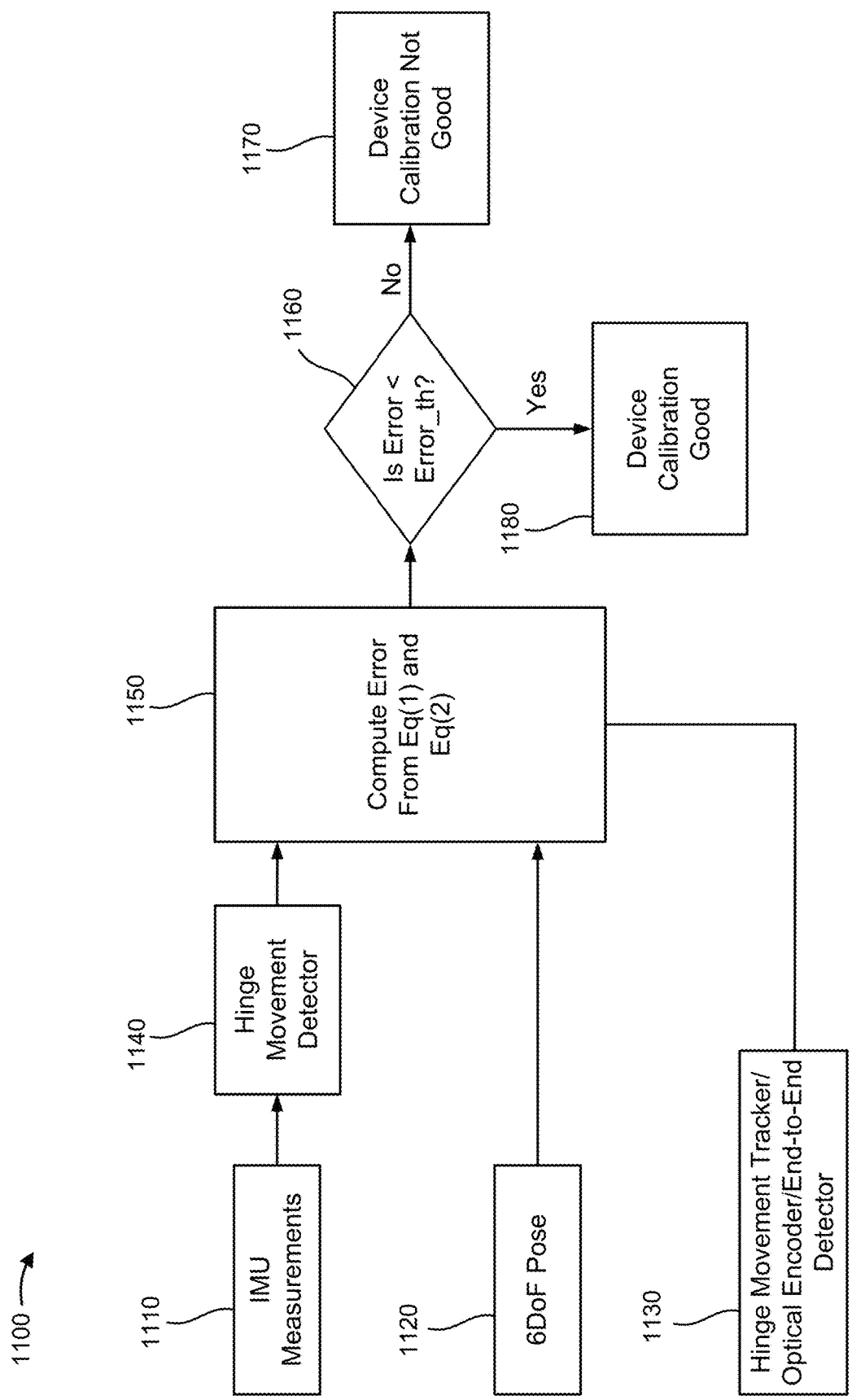
FIG. 11 is a flowchart illustrating an example of a process for determining whether parameters (e.g., calibration parameters) for an HMD are accurate, in accordance with some examples.

FIG. 11 shows an example of a process for validating the 6DoF performance of the HMD. In particular, FIG. 11 is a flowchart illustrating an example of a process 1100 for determining whether calibration parameters for an HMD are accurate. In FIG. 11, during operation of the process 1100, while the hinge of the display of the HMD is moving along or about the axis (e.g. pitch axis) of the hinge, sensor measurements (e.g., IMU measurements 1110, hinge movement tracker measurements 1130, and 6DoF pose measurements 1120) can be obtained by sensors (e.g., an IMU sensor, such as accelerometer 304 and gyroscope 306 of FIG. 3; a hinge movement tracker, such as an optical encoder or an end-to-end detector; and a camera sensor, such as image sensor 302 of FIG. 3 and camera 410 of FIG. 4) of the HMD.

Some of the obtained sensor measurements (e.g., the IMU measurements 1110) can be inputted into a hinge movement detector 1140 (e.g., an algorithm) of the HMD. One or more processors (e.g., compute components 310 of FIG. 3 or processor 1310 of FIG. 13) of the HMD can determine whether (or not) the HMD is moving along or about the axis (e.g., pitch axis) of the hinge by processing the hinge movement detector 1140 (algorithm) using the inputted sensor measurements (e.g., the IMU measurements 1110).

The sensor measurements (e.g., IMU measurements 1110, hinge movement tracker measurements 1130, and 6DoF pose measurements 1120) can be inputted into a error computation algorithm 1150 for calibration. When the one or more processors of the HMD determines (e.g., using the hinge movement detector 1140) that that HMD is moving along or about the axis (e.g., pitch axis) of the hinge, the one or more processors (e.g., compute components 310 of FIG. 3 or processor 1310 of FIG. 13) can compute the rotation error (e.g., using equation (1)) and the translation error (e.g., using equation (2)) using the sensor measurements (e.g., IMU measurements 1110, hinge movement tracker measurements 1130, and 6DoF pose measurements 1120).

The one or more processors of the HMD can then compare the determined rotation error and translation error to an error threshold 1160, which may be predetermined. In one or more examples, the error threshold can be based on pixel displacement (e.g., a reprojection error) within an image(s), such as an error threshold of five to six pixels. When the one or more processors of the HMD determine that the rotation error and translation error are below (less than) the error threshold, the one or more processors of the HMD can determine that the calibration parameters are accurate and the device calibration is good 1180 (thus verifying the calibration). However, when the one or more processors of the HMD determine that the rotation error and translation error are above (greater than) or equal to the error threshold, the one or more processors of the HMD can determine that the calibration parameters are not accurate and the device calibration is not good 1170.

Figure 12:
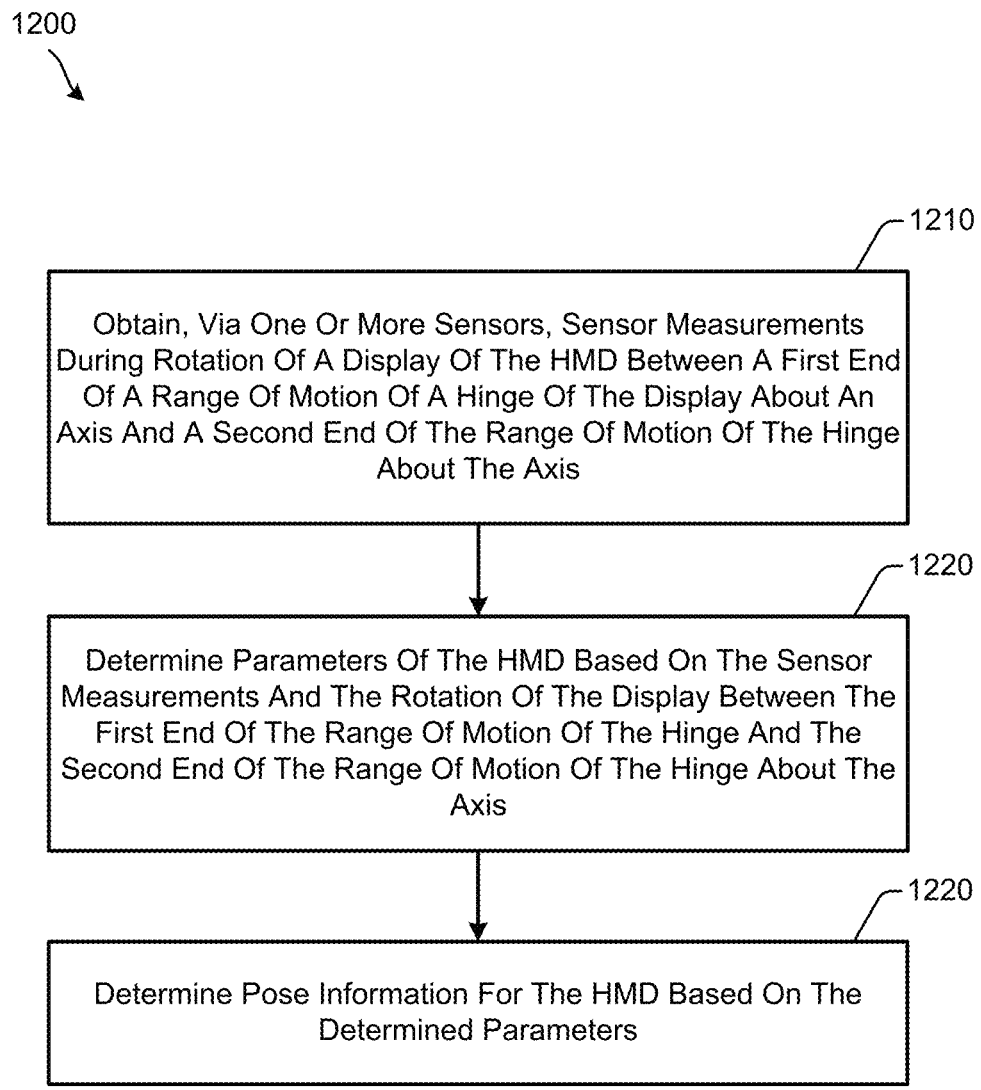
FIG. 12 is a flowchart illustrating an example of a process for using HMD hinge motion to calibrate the HMD, in accordance with some examples of the present disclosure.

FIG. 12 is a flow chart illustrating an example of a process 1200 for using HMD hinge motion to calibrate the HMD. The process 1200 can be performed by a computing device (or apparatus) or a component (e.g., a chipset, one or more processors, etc.) of the computing device. The computing device may be an HMD (e.g., an XR HMD such as a VR, AR, and/or MR headset, a set of AR and/or MR glasses, or other type of HMD) or other type of computing device. In some cases, the computing device (or apparatus) is part of the HMD device (e.g., a component of the HMD device, such as a chipset). In some cases, the computing device (or apparatus) is the HMD device, in which case the computing device can include one or more sensors, a display, a hinge, and other components of the HMD. The operations of the process 1200 may be implemented as software components that are executed and run on one or more processors (e.g., the CPU 312, the GPU 314, the DSP 316, and/or the ISP 318 of FIG. 3, the processor 1310 of FIG. 13, or other processor(s)). Further, the transmission and reception of signals by the computing device in the process 1200 may be enabled, for example, by one or more antennas, one or more transceivers (e.g., wireless transceiver(s)), and/or other communication components of the computing device.

At block 1210, the computing device (or component thereof) can obtain, via one or more sensors, sensor measurements during rotation of a display of the HMD between a first end of a range of motion of a hinge of the display about an axis (e.g., a pitch axis or other axis of the hinge of the display) and a second end of the range of motion of the hinge about the axis. In some cases, the rotation of the display between the first end of the range of motion of the hinge about the axis and the second end of the range of motion of the hinge about the axis about is only about the axis of the hinge. In some aspects, the rotation of the display of the HMD about the axis of the hinge of the display is based on user input (e.g., a user rotating the display about the axis using the hinge).

As noted above, in some cases, the computing device can be the HMD, in which case the HMD can include the one or more sensors, the hinge, the display, and other components. In such cases, the computing device (the HMD) can obtain the sensor measurements using the one or more sensors of the HMD. In some examples, the one or more sensors comprises at least one of an inertial measurement unit (IMU) sensor, an image sensor, a camera sensor, a hinge movement tracker, an optical encoder, an end-to-end detector, and/or other sensor.

At block 1220, the computing device (or component thereof) can determine parameters of the HMD based on the sensor measurements and the rotation of the display between the first end of the range of motion of the hinge and the second end of the range of motion of the hinge about the axis. In some cases, the parameters include one or more camera intrinsic parameters, one or more camera extrinsic parameters, a camera-inertial measurement unit (IMU) placement, an IMU scale factor, an IMU misalignment, any combination thereof, and/or other parameters. In some cases, the parameters can be calibration parameters, as described herein.

At block 1230, the computing device (or component thereof) can determine pose information for the HMD based on the determined parameters. For example, the pose information can include 6DOF pose information (e.g., translation and orientation, such as horizontal, vertical, and depth coordinates relative to a frame of reference and roll, pitch, and yaw relative to the same frame of reference).

In some aspects, the computing device (or component thereof) can determine whether the display of the HMD is only moving about the axis of the hinge of the display. In some cases, the computing device (or component thereof) can determine the parameters using a calibration algorithm. In some examples, the calibration algorithm can include a reprojection error, an IMU propagation error, a rotation error, and a translation error based on determining that the HMD is only moving about the axis of the hinge of the display. In some examples, the calibration algorithm can include a reprojection error and an IMU propagation error based on determining that the HMD is not only moving about the axis of the hinge of the display.

In some aspects, the computing device (or component thereof) can determine a rotation error and a translation error based on the sensor measurements. The computing device (or component thereof) can compare the rotation error and the translation error to an error threshold. The computing device (or component thereof) can determine an accuracy of the parameters based on comparing the rotation error and the translation error to the error threshold. For instance, the computing device (or component thereof) can determine that the parameters are accurate based on determining that the rotation error and the translation error are one of above or equal to the error threshold. In another example, the computing device (or component thereof) can determine that the parameters are not accurate based on determining the rotation error and the translation error are below the error threshold. In some cases, the error threshold can be based on pixel displacement (e.g., a reprojection error) within an image(s), such as an error threshold of five to six pixels.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1200 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1200 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
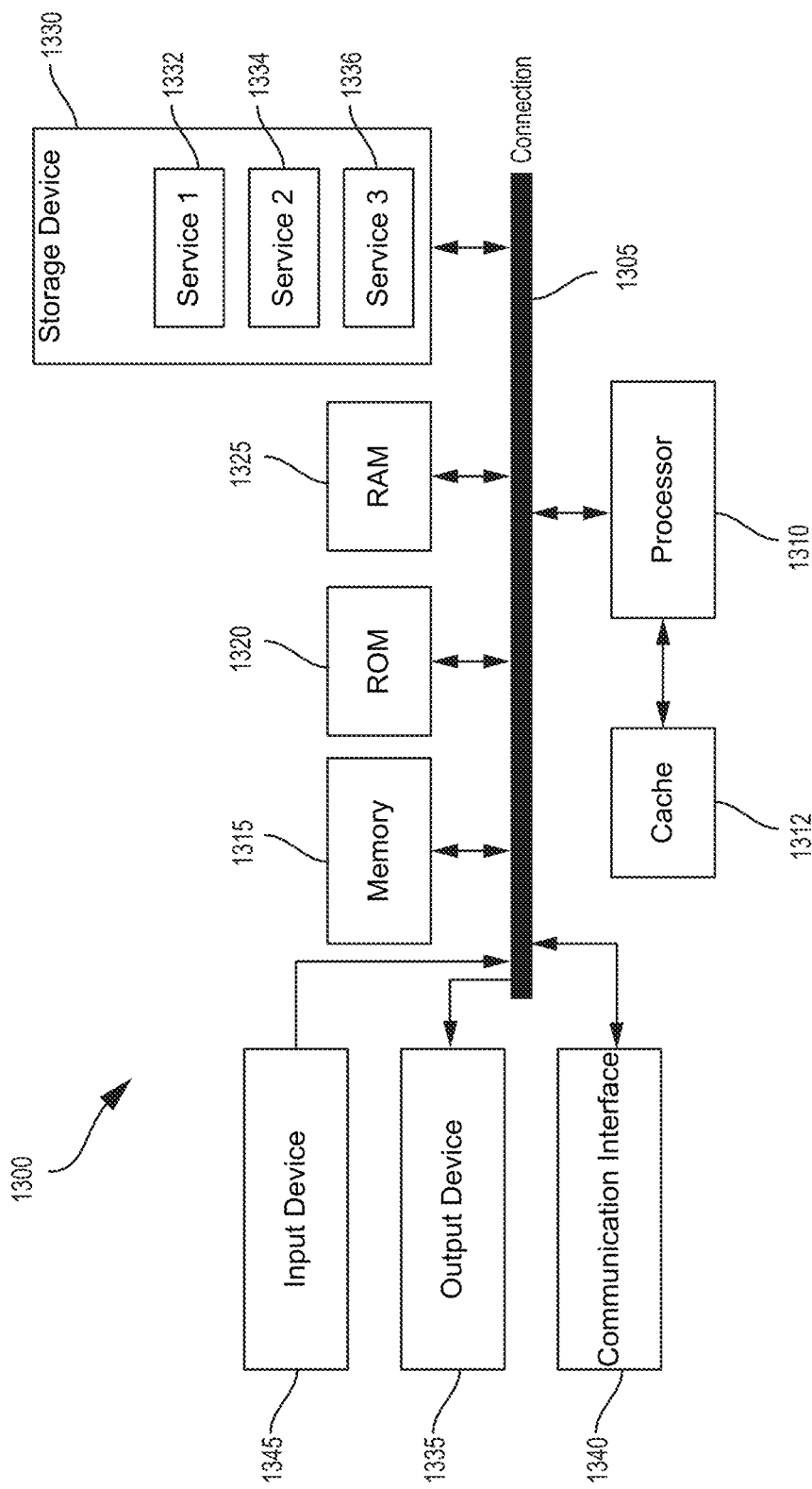
FIG. 13 is a diagram illustrating an example of a computing system, according to aspects of the disclosure.

FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along or about the electromagnetic spectrum, or some combination thereof.

The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memory storage, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to" and/or "at least one processor being configured to" indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method for optimizing one or more parameters of ahead mounted display (HMD) device, the method comprising: obtaining, by one or more sensors of the HMD, sensor measurements during rotation of a display of the HMD between a first end of a range of motion of a hinge of the display about an axis and a second end of the range of motion of the hinge about the axis; determining, by one or more processors of the HMD, parameters of the HMD based on the sensor measurements and the rotation of the display between the first end of the range of motion of the hinge and the second end of the range of motion of the hinge about the axis; and determining pose information for the HMD based on the determined parameters.

Aspect 2. The method of Aspect 1, wherein the rotation of the display of the HMD about the axis of the hinge of the display is based on user input.

Aspect 3. The method of any one of Aspects 1 or 2, wherein the axis is a pitch axis of the hinge of the display.

Aspect 4. The method of any one of Aspects 1 to 3, wherein the one or more sensors comprises at least one of an inertial measurement unit (IMU) sensor, an image sensor, a camera sensor, a hinge movement tracker, an optical encoder, or an end-to-end detector.

Aspect 5. The method of any one of Aspects 1 to 4, wherein the parameters comprise at least one of one or more camera intrinsic parameters, one or more camera extrinsic parameters, a camera-inertial measurement unit (IMU) placement, an IMU scale factor, or an IMU misalignment.

Aspect 6. The method of any one of Aspects 1 to 5, further comprising determining, by the one or more processors of the HMD, whether the display of the HMD is only moving about the axis of the hinge of the display.

Aspect 7. The method of Aspect 6, wherein the parameters are determined using a calibration algorithm, the calibration algorithm comprising a reprojection error, an IMU propagation error, a rotation error, and a translation error based on determining that the HMD is only moving about the axis of the hinge of the display.

Aspect 8. The method of Aspect 6, wherein the parameters are determined using a calibration algorithm, the calibration algorithm comprising a reprojection error and an IMU propagation error based on determining that the HMD is not only moving about the axis of the hinge of the display.

Aspect 9. The method of any one of Aspects 1 to 8, further comprising: determining, by the one or more processors of the HMD, a rotation error and a translation error based on the sensor measurements; comparing, by the one or more processors of the HMD, the rotation error and the translation error to an error threshold; and determining, by the one or more processors of the HMD, an accuracy of the parameters based on comparing the rotation error and the translation error to the error threshold.

Aspect 10. The method of Aspect 9, further comprising: determining, by the one or more processors of the HMD, that the parameters are accurate based on determining the rotation error and the translation error are one of above or equal to the error threshold.

Aspect 11. The method of Aspect 9, further comprising: determining, by the one or more processors of the HMD, that the parameters are not accurate based on determining the rotation error and the translation error are below the error threshold.

Aspect 12. The method of any one of Aspects 9 to 11, wherein the error threshold is based on pixel displacement.

Aspect 13. The method of any one of Aspects 1 to 12, wherein the HMD is an extended reality (XR) HMD.

Aspect 14. The method of any one of Aspects 1 to 13, wherein the rotation of the display between the first end of the range of motion of the hinge about the axis and the second end of the range of motion of the hinge about the axis about is only about the axis of the hinge.

Aspect 15. An apparatus for optimizing one or more parameters of a head mounted display (HMD) device, the apparatus comprising: at least one memory; and at least one processor coupled to the at least one memory and configured to: obtain, via one or more sensors, sensor measurements during rotation of a display of the HMD between a first end of a range of motion of a hinge of the display about an axis and a second end of the range of motion of the hinge about the axis; determine parameters of the HMD based on the sensor measurements and the rotation of the display between the first end of the range of motion of the hinge and the second end of the range of motion of the hinge about the axis; and determine pose information for the HMD based on the determined parameters.

Aspect 16. The apparatus of Aspect 15, wherein the rotation of the display of the HMD about the axis of the hinge of the display is based on user input.

Aspect 17. The apparatus of any one of Aspects 15 or 16, wherein the axis is a pitch axis of the hinge of the display.

Aspect 18. The apparatus of any one of Aspects 15 to 17, wherein the one or more sensors comprises at least one of an inertial measurement unit (IMU) sensor, an image sensor, a camera sensor, a hinge movement tracker, an optical encoder, or an end-to-end detector.

Aspect 19. The apparatus of any one of Aspects 15 to 18, wherein the parameters comprise at least one of one or more camera intrinsic parameters, one or more camera extrinsic parameters, a camera-inertial measurement unit (IMU) placement, an IMU scale factor, or an IMU misalignment.

Aspect 20. The apparatus of any one of Aspects 15 to 19, wherein the at least one processor is configured to determine whether the display of the HMD is only moving about the axis of the hinge of the display.

Aspect 21. The apparatus of Aspect 20, wherein the parameters are determined using a calibration algorithm, the calibration algorithm comprising a reprojection error, an IMU propagation error, a rotation error, and a translation error based on determining that the HMD is only moving about the axis of the hinge of the display.

Aspect 22. The apparatus of Aspect 20, wherein the parameters are determined using a calibration algorithm, the calibration algorithm comprising a reprojection error and an IMU propagation error based on determining that the HMD is not only moving about the axis of the hinge of the display.

Aspect 23. The apparatus of any one of Aspects 15 to 22, wherein the at least one processor is configured to: determine a rotation error and a translation error based on the sensor measurements; compare the rotation error and the translation error to an error threshold; and determine an accuracy of the parameters based on comparing the rotation error and the translation error to the error threshold.

Aspect 24. The apparatus of Aspect 23, wherein the at least one processor is configured to: determine that the parameters are accurate based on determining the rotation error and the translation error are one of above or equal to the error threshold.

Aspect 25. The apparatus of Aspect 23, wherein the at least one processor is configured to: determine that the parameters are not accurate based on determining the rotation error and the translation error are below the error threshold.

Aspect 26. The apparatus of any one of Aspects 23 to 25, wherein the error threshold is based on pixel displacement.

Aspect 27. The apparatus of any one of Aspects 15 to 26, wherein the HMD is an extended reality (XR) HMD.

Aspect 28. The apparatus of any one of Aspects 15 to 27, wherein the rotation of the display between the first end of the range of motion of the hinge about the axis and the second end of the range of motion of the hinge about the axis about is only about the axis of the hinge.

Aspect 29. The apparatus of any one of Aspects 15 to 28, wherein the apparatus is part of the HMD device.

Aspect 30. The apparatus of any one of Aspects 15 to 29, wherein the apparatus is the HMD device, the apparatus further comprising the one or more sensors, the display, and the hinge.

Aspect 31. A non-transitory computer-readable storage medium comprising instructions stored thereon which, when executed by at least one processor, causes the at least one processor to perform operations according to any one of Aspects 1 to 14.

Aspect 32. An apparatus for optimizing one or more parameters of a head mounted display (HMD) device, comprising one or more means for performing operations according to any one of Aspects 1 to 14.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A method for optimizing one or more parameters of a head mounted display (HMD), the method comprising: obtaining, by one or more sensors of the HMD, sensor measurements during rotation of a display of the HMD between a first end position of a range of motion of a hinge of the display about an axis and a second end position of the range of motion of the hinge about the axis, wherein the hinge connects the display of the HMD to a portion of the HMD, and wherein the display is configured to move about the hinge between the first end position and the second end position;
   determining, by one or more processors of the HMD, parameters of the HMD based on the sensor measurements and the rotation of the display between the first end position of the range of motion of the hinge and the second end position of the range of motion of the hinge about the axis; and
   determining pose information for the HMD based on the determined parameters.

2. The method of claim 1, wherein the rotation of the display of the HMD about the axis of the hinge of the display is based on user input.

3. The method of claim 1, wherein the axis is a pitch axis of the hinge of the display.

4. The method of claim 1, wherein the one or more sensors comprises at least one of an inertial measurement unit (IMU) sensor, an image sensor, a camera sensor, a hinge movement tracker, an optical encoder, or an end-to-end detector.

5. The method of claim 1, wherein the parameters comprise at least one of one or more camera intrinsic parameters, one or more camera extrinsic parameters, a camera-inertial measurement unit (IMU) placement, an IMU scale factor, or an IMU misalignment.

6. The method of claim 1, further comprising determining, by the one or more processors of the HMD, whether the display of the HMD is only moving about the axis of the hinge of the display.

7. The method of claim 6, wherein the parameters are determined using a calibration algorithm, the calibration algorithm comprising a reprojection error, an IMU propagation error, a rotation error, and a translation error based on determining that the HMD is only moving about the axis of the hinge of the display.

8. The method of claim 6, wherein the parameters are determined using a calibration algorithm, the calibration algorithm comprising a reprojection error and an IMU propagation error based on determining that the HMD is not only moving about the axis of the hinge of the display.

9. The method of claim 1, further comprising:
determining, by the one or more processors of the HMD, a rotation error and a translation error based on the sensor measurements;
comparing, by the one or more processors of the HMD, the rotation error and the translation error to an error threshold; and
determining, by the one or more processors of the HMD, an accuracy of the parameters based on comparing the rotation error and the translation error to the error threshold.

10. The method of claim 9, further comprising:
determining, by the one or more processors of the HMD, that the parameters are accurate based on determining the rotation error and the translation error are one of above or equal to the error threshold.

11. The method of claim 9, further comprising:
determining, by the one or more processors of the HMD, that the parameters are not accurate based on determining the rotation error and the translation error are below the error threshold.

12. The method of claim 9, wherein the error threshold is based on pixel displacement.

13. The method of claim 1, wherein the rotation of the display between the first end position of the range of motion of the hinge about the axis and the second end position of the range of motion of the hinge about the axis about is only about the axis of the hinge.

14. An apparatus for optimizing one or more parameters of a head mounted display (HMD), the apparatus comprising:
at least one memory; and
at least one processor coupled to the at least one memory and configured to:
obtain, via one or more sensors, sensor measurements during rotation of a display of the HMD between a first end position of a range of motion of a hinge of the display about an axis and a second end position of the range of motion of the hinge about the axis, wherein the hinge connects the display of the HMD to a portion of the HMD, and wherein the display is configured to move about the hinge between the first end position and the second end position;
determine parameters of the HMD based on the sensor measurements and the rotation of the display between the first end position of the range of motion of the hinge and the second end position of the range of motion of the hinge about the axis; and
determine pose information for the HMD based on the determined parameters.

15. The apparatus of claim 14, wherein the rotation of the display of the HMD about the axis of the hinge of the display is based on user input.

16. The apparatus of claim 14, wherein the axis is a pitch axis of the hinge of the display.

17. The apparatus of claim 14, wherein the one or more sensors comprises at least one of an inertial measurement unit (IMU) sensor, an image sensor, a camera sensor, a hinge movement tracker, an optical encoder, or an end-to-end detector.

18. The apparatus of claim 14, wherein the parameters comprise at least one of one or more camera intrinsic parameters, one or more camera extrinsic parameters, a camera-inertial measurement unit (IMU) placement, an IMU scale factor, or an IMU misalignment.

19. The apparatus of claim 14, wherein the at least one processor is configured to determine whether the display of the HMD is only moving about the axis of the hinge of the display.

20. The apparatus of claim 19, wherein the parameters are determined using a calibration algorithm, the calibration algorithm comprising a reprojection error, an IMU propagation error, a rotation error, and a translation error based on determining that the HMD is only moving about the axis of the hinge of the display.

21. The apparatus of claim 19, wherein the parameters are determined using a calibration algorithm, the calibration algorithm comprising a reprojection error and an IMU propagation error based on determining that the HMD is not only moving about the axis of the hinge of the display.

22. The apparatus of claim 14, wherein the at least one processor is configured to:
determine a rotation error and a translation error based on the sensor measurements;
compare the rotation error and the translation error to an error threshold; and
determine an accuracy of the parameters based on comparing the rotation error and the translation error to the error threshold.

23. The apparatus of claim 22, wherein the at least one processor is configured to:
determine that the parameters are accurate based on determining the rotation error and the translation error are one of above or equal to the error threshold.

24. The apparatus of claim 22, wherein the at least one processor is configured to:
determine that the parameters are not accurate based on determining the rotation error and the translation error are below the error threshold.

25. The apparatus of claim 22, wherein the error threshold is based on pixel displacement.

26. The apparatus of claim 14, wherein the rotation of the display between the first end position of the range of motion of the hinge about the axis and the second end position of the range of motion of the hinge about the axis about is only about the axis of the hinge.

27. The apparatus of claim 14, wherein the apparatus is part of the HMD.

28. The apparatus of claim 14, wherein the apparatus is the HMD, the apparatus further comprising the one or more sensors, the display, and the hinge.

29. The method of claim 1, wherein the portion of the HMD includes a body of the HMD.

30. The apparatus of claim 14, wherein the portion of the HMD includes a body of the HMD.

* * * * *